United States Patent
Grabau et al.

(10) Patent No.: US 10,139,897 B2
(45) Date of Patent: Nov. 27, 2018

(54) POWER-OPTIMIZED IMAGE CAPTURE AND PUSH

(71) Applicant: Novi Security, Inc., Orem, UT (US)

(72) Inventors: Ethan Grabau, South Jordan, UT (US); Tyler Crawford, South Jordan, UT (US); Martin Johnson, South Jordan, UT (US); Ruchir Chauhan, South Jordan, UT (US); Jonathan Jensen, South Jordan, UT (US)

(73) Assignee: NOVI SECURITY, INC., Orem, UT (US)

( * ) Notice: Subject to any disclaimer, the term of this patent is extended or adjusted under 35 U.S.C. 154(b) by 208 days.

(21) Appl. No.: 14/937,728

(22) Filed: Nov. 10, 2015

(65) Prior Publication Data
US 2016/0134794 A1 May 12, 2016

Related U.S. Application Data

(60) Provisional application No. 62/077,836, filed on Nov. 10, 2014.

(51) Int. Cl.
*H04N 5/225* (2006.01)
*G06K 9/00* (2006.01)
(Continued)

(52) U.S. Cl.
CPC .......... *G06F 1/3296* (2013.01); *G06F 1/3206* (2013.01); *G06F 1/3215* (2013.01);
(Continued)

(58) Field of Classification Search
CPC ............. H04N 5/2257; H04N 5/23222; H04N 5/2256; G06K 9/00771; G06F 1/3296; G06F 1/3206; G06F 1/3215; G06F 1/3287
(Continued)

(56) References Cited

U.S. PATENT DOCUMENTS

| | | | | |
|---|---|---|---|---|
| 6,081,606 A | * | 6/2000 | Hansen | G06K 9/00771 |
| | | | | 348/699 |
| 7,471,334 B1 | * | 12/2008 | Stenger | G03B 29/00 |
| | | | | 348/143 |

(Continued)

OTHER PUBLICATIONS

Genetec, "Unified Alarm Management: Centralize alarm management across all of your sites and security applications," 2014 (2 pages).
(Continued)

*Primary Examiner* — Andy Rao
*Assistant Examiner* — Zaihan Jiang
(74) *Attorney, Agent, or Firm* — Patent Law Works LLP

(57) ABSTRACT

An example security sensor includes a battery power supply, camera coupled to the battery power supply to receive power, activity sensor, processor, and microcontroller. The processor is placed in a sleep state and is wakeable to an awake state. The processor coupled to the battery power supply, and coupled to the camera to receive and process image data including images of an activity within a zone. The microcontroller is coupled to the battery power supply, coupled to the activity sensor to receive interrupts responsive to detection by the activity sensor of the activity within the zone proximate the security sensor, coupled to the processor to send and receive data, and, responsive to receiving a first interrupt from the activity sensor, place the processor in an awake state to signal the camera to capture a set of images and to receive and process the image data including the set of images.

22 Claims, 22 Drawing Sheets

(51) Int. Cl.
 *H04N 5/232* (2006.01)
 *G06F 1/32* (2006.01)

(52) U.S. Cl.
 CPC ....... *G06F 1/3287* (2013.01); *G06K 9/00771* (2013.01); *H04N 5/2256* (2013.01); *H04N 5/2257* (2013.01); *H04N 5/23222* (2013.01); *H04N 5/23241* (2013.01); *Y02D 10/171* (2018.01); *Y02D 10/172* (2018.01); *Y02D 50/20* (2018.01)

(58) Field of Classification Search
 USPC .......................................................... 348/155
 See application file for complete search history.

(56) References Cited

U.S. PATENT DOCUMENTS

| | | | |
|---|---|---|---|
| 9,009,805 | B1 | 4/2015 | Kirkby et al. |
| 9,064,394 | B1 | 6/2015 | Trundle |
| 9,082,018 | B1 | 7/2015 | Laska et al. |
| 9,158,974 | B1 | 10/2015 | Laska et al. |
| 9,170,707 | B1 | 10/2015 | Laska et al. |
| 9,213,903 | B1 | 12/2015 | Laska et al. |
| 9,224,044 | B1 | 12/2015 | Laska et al. |
| 2008/0122938 | A1* | 5/2008 | Broberg ................. G08B 25/01 348/222.1 |
| 2014/0149754 | A1* | 5/2014 | Silva ..................... G06F 1/3212 713/300 |
| 2014/0210646 | A1* | 7/2014 | Subramanya ........... B61L 29/28 340/928 |
| 2014/0320309 | A1* | 10/2014 | Zhang ..................... H04Q 9/00 340/870.07 |
| 2015/0003309 | A1* | 1/2015 | Mukherjee ............ H04W 40/10 370/311 |
| 2015/0135259 | A1* | 5/2015 | Ilyadis ................ H04L 63/0227 726/1 |
| 2016/0004390 | A1 | 1/2016 | Laska et al. |
| 2016/0005280 | A1 | 1/2016 | Laska et al. |
| 2016/0005281 | A1 | 1/2016 | Laska et al. |

OTHER PUBLICATIONS

Sandboxhome, "Redefining Home Security for families worldwide!: Extensive features. Stylish. Affordable." Jan. 9, 2016 downloaded from www.mysandboxhome.com/index.html (9 pages).

Indiegogo, "SandboxHome: Redefining Home Security for families worldwide!: The Most Advanced and Complete Security Product—Designed Specifically for Families!" Jan. 9, 2016 (25 pages).

* cited by examiner

```
#ifndef GLOBALVARIABLEDEFS_H
define GLOBALVARIABLEDEFS_H                                    600 enum I2C_State {
        I2C_Idle_ST =   1,
        I2C_Address_ST = 2,         // The case of an aligned address
        I2C_ReadAck_ST = 3,
        I2C_LoadData_ST = 4,        // last step of read
        I2C_WriteAck_ST = 5,
        I2C_WriteData_ST = 6,
        I2C_DataAck_ST = 7,         // acknolwedge reception of data to be written
        I2C_Done_ST =   8,
        I2C_Collision_ST = 14,
        I2C_Error_ST =   15,
};

enum Update_State {
        Update_Hold_ST,
        Update_Queued_ST,
        Update_Execute_ST,
};

typedef union PortB_Type {
        // All bits should be adjusted for active high conditions.
        struct {           // ascends from bit 0 to bit 7
                unsigned pir_comm_link:1;      // output only to PIR.
                unsigned smoke_sout_0:1;
                unsigned smoke_sout_1:1;
                unsigned smoke_sout_2:1;

unsigned user_button_pressed:1;
                unsigned sam4s_to_pic_wakeup:1;
                unsigned smoke_output:1;
                unsigned pir_output:1;
        } bits;

struct {           // ascends from bit 0 to bit 7
                unsigned:1;
                unsigned sout:3;

unsigned:1;
                unsigned:1;
                unsigned:1;
                unsigned:1;
        } smoke;
        uint8_t byte;
};
```

Figure 6A

```
// AS5303 smoke sensor IC SOUT definitions (3-bits)
#define STANDBY         0x00
#define LOCAL_ALARM     0x01
#define REMOTE_ALARM    0x02
#define PUSH_TEST_PASSED 0x03
#define PUSH_TEST_FAILED 0x04
#define SMOKE_LOW_BATTERY 0x05
#define DEGRADED_CHAMBER 0x06

/*
 * I2C register and bit definitions.
 * These are what the SAM (or PICkit Serial) read / write.
 */
typedef union I2C_Data_Type
{
        /*
         * The following only works because of the native 8 bit / byte
         * architecture of the chosen PIC
         */
        uint8_t i2c_byte_access[8];     // Access via I2C read/write routines /* Below is to allow access to key settings by various routines */
        struct {
                union           // STATUS, I2C base address (READ ONLY)
                {
                        struct { // ascends from bit 0 to bit 7
                                unsigned pic_had_wd_timeout:1;
                                unsigned low_batt:1;
                                unsigned unused2:1;
                                unsigned chamber_test_failed:1;

unsigned user_button_pressed:1;
                                // The SAM processor wishes to wake up the PIC (RMW: huh?)
                                unsigned sam4s_to_pic_wakeup:1;
                                unsigned smoke_event:1;
                                unsigned pir_event:1;
                        } bits;
                        uint8_t byte;
                } status;

union           // CTRL1, I2C base address + 2
                {
                        struct { // ascends from bit 0 to bit 7
                                unsigned turn_on_siren:1;
```

Figure 6B

```
#ifdef DIRECT_3p3_CONTROL
                    unsigned enable_3p3_buck:1;
#else
                    /* When =1, keeps 3p3V alive during sleep mode */
                    unsigned enable_3p3_during_sleep:1;
#endif
                    unsigned enable_LED:1;
                    unsigned enable_radio:1;

unsigned enable_flash:1;
                    unsigned enable_camera:1;
                    unsigned enable_smoke:1;
                    unsigned enable_pir:1;
            } bits;
            uint8_t byte;
    } ctrl1;

union           // CTRL2, I2C base address + 4
    {
            struct { // ascends from bit 0 to bit 7
                    /* Cleared by PIC firmware */
                    unsigned go_to_sleep:1;
                    /* single shot - cleared by PIC firmware */
                    unsigned chirp_siren:1;
                    /* on/off controlled by i2c.  Suspended during sleep */
                    unsigned siren_beep:1;
                    /*
                     * If ALL_STATUS_CLEARED_AFTER_READ is not defined,
                     * this bit clears ALL status bits.  This bit is cleared
                     * by PIC when completed.
                     */
                    unsigned clear_status_flags:1;

/*
                     * an i2c alterable bit to set the wake pin high or low,
                     * toggled by PIC after wake (PIC event to SAM wakeup)
                     */
                    unsigned sam4s_wake_state:1;
                    /*
                     * pushes PIR settings out to the PIR sensor.
                     * Cleared by PIC when complete
                     */
                    unsigned push_pir_updates:1;
                    /* Initiates a battery test. Cleared by PIC when complete */
                    unsigned test_batt_voltage:1;
                    /* Initiates a smoke chamber test. Cleared by PIC when complete */
                    unsigned test_smoke_chamber:1;
            } bits;
            uint8_t byte;
    } ctrl2;
```

Figure 6C

```
union           // MISC, I2C base address + 6
{
        struct { // ascends from bit 0 to bit 7
                /*
                 * Indicate that the camera is ready for comm.
                 * The flash may or may not be ready - not a show stopper.
                 */
                unsigned event_camera_and_flash_powered:1;
                unsigned rube_g_1:1;
                unsigned rube_g_2:1;
                unsigned rube_g_3:1;

unsigned rube_g_4:1;
                unsigned rube_g_5:1;
                unsigned rube_g_6:1;
                unsigned rube_g_7:1;
        } bits;
        uint8_t byte;
} misc;

/*
 * PIR data is structured as 3 single bytes for I2C compatability
 * Must be structured MSB to LSB in the array stack.
 * I2C data can be written normally - NOT bit reversed
 */
struct {
        union      // PIR2, I2C base address + 8 decimal
        {
                struct { // ascends from bit 0 to bit 7
                        /* ensure this variable is set to 0x8 */
                        unsigned always_0x8:4;
                        unsigned filter_source:2;
                        /* ensure this variable is set to 0x2 */
                        unsigned always_0x2:2;
                } regs;
                uint8_t byte;
        } group2;

union      // PIR3, I2C base address + 10 decimal
        {
                struct { // ascends from bit 0 to bit 7
                        unsigned window_time:2;
                        unsigned pulse_count:2;
                        unsigned blind_time:4;
                } regs;
                uint8_t byte;
        } group3;

uint8_t sensitivity;      // I2C base address + 12
        // The MSB of sensitivity is located at pir_serial_bits[24]
        // The LSB of sensitivity is located at pir_serial_bits[17]
} pir_settings;   // End of structure as 3 single bytes for I2C compatability
```

Figure 6D

```
/*
 * Key value of last battery check.
 * I2C base address + 14 decimal (read only)
 */
    uint8_t batt_meter;
  }; // End of individualized bytes
}; // End of top union statement (I2C byte array and individualized bytes)

#endif /* GLOBALVARIABLEDEFS_H */
```

Figure 6E

POWER-OPTIMIZED IMAGE CAPTURE AND PUSH

CROSS-REFERENCE TO RELATED APPLICATIONS

This application claims the benefit under 35 U.S.C. § 119(e) of U.S. Provisional Patent Application No. 62/077,836, entitled "Premises Monitoring and Threat Detection, Reporting, and Mitigation" and filed Nov. 10, 2014, the entire contents of which are incorporated herein by reference.

BACKGROUND

The present disclosure relates to power management for security sensors.

Existing security system providers provide home and business owners with security systems to monitor their homes and establishments for various threats, such as intruders, fires, etc. However, these providers generally use large call centers staffed by personnel who are tasked with calling stakeholders when their security systems have been tripped by security threat, such as an intruder breaking into a home. These call centers are expensive to operate and the costs for operating them are passed along to the providers' customers. More particularly, customers are generally required to sign contracts and pay relative expensive monthly subscription fees in order to access the security services provided by these solutions. This often leads to frustration because even if customers tire of the expensive subscription fees, they are locked into their contracts until the terms expire.

Moreover, due to the costs of these systems and the extensive installation requirements (e.g., wiring, mounting of sensor hardware and panels, integration with telecommunication systems, etc.), the security systems are generally only accessible to a certain segment of the market, such as people who own their own buildings and have the freedom and money to have such systems installed therein.

Some current systems that use battery powered, wireless monitoring devices to monitor a premises have either removed the ability to provide images of security threats due to the typically computationally expensive processing required to capture, generate, and transmit the images to the user devices of the stakeholders, or require stakeholders to constantly charge or change the batteries in those monitoring devices, which is frustrating to users and leads to low user adoption and sales.

Other available solutions provide little to no control to the customers, and are thus less desirable. Rather, these solutions/security systems often operate blindly, relying on conventional timers and smoke alarms, to determine if threats exist. This can lead to the security system installations triggering frequent false positive alarms, the remediation of which by the call centers or first responders can be very costly. These costs are often passed on down to the customers as well, thereby further exacerbating frustration of those customers.

SUMMARY

This disclosure describes technology that addresses the above-noted deficiencies of existing solutions. In one innovative aspect, a security sensor comprises a battery power supply, a camera, an activity sensor, a processor, and a microcontroller. The camera is coupled to the battery power supply to receive power. The activity sensor is coupled to the battery power supply to receive power. The activity sensor configured to detect activity within a zone proximate the security sensor. The processor is placed in a sleep state and wakeable to an awake state. The processor is coupled to the battery power supply to receive power, and coupled to the camera to receive and process image data including images of the activity within the zone. The microcontroller is coupled to the battery power supply to receive power, coupled to the activity sensor to receive interrupts responsive to detection by the activity sensor of the activity within the zone proximate the security sensor, coupled to the processor to send and receive data, and, responsive to receiving a first interrupt from the activity sensor, place the processor in an awake state to signal the camera to capture a set of images and to receive and process the image data including the set of images.

In this or other aspects, the security sensor may additionally or alternatively include one or more of the following features: that the processor, upon being placed in the awake state, polls the microcontroller for any events that occurred during the sleep state, determines a motion detection event occurred, sends a capture signal to the camera, and receives and processes the image data including set of images; a non-transitory memory coupled to the battery power supply and the processor; a transceiver coupled to the battery power supply, the memory, and the processor; that, responsive to receiving the image data from the camera, the processor caches the image data in the non-transitory memory and the transceiver retrieves the image data cached in the non-transitory memory and transmits the image data to a security sensor relay for transmission to a security server accessible via the Internet; that the battery power supply, the camera when idle, the activity sensor when idle, the microcontroller, the processor when in a sleep state, the non-transitory memory, and the transceiver when idle, collectively draw a current of less than or equal to about 100 micro amps; a non-transitory memory integrated with the microcontroller that stores state data including operational settings for the activity sensor; that, upon awaking the processor retrieves the state data from the non-transitory memory integrated with the microcontroller; that the processor operates on a sleep cycle and includes a sleep timer that routinely wakes the processor from the sleep state based on an expiration of a sleeping period; that the sleeping period is predetermined or dynamically set; that the activity sensor is a motion sensor configured to detect motion of a moving object within the zone; that the motion sensor is a passive infrared sensor; that the activity sensor is a smoke detector configured to detect smoke within the zone.

In another innovative aspect, a method for controlling operation of a security sensor, comprises: placing a processor of a security sensor in a sleep state, the processor being wakeable to an awake state and being coupled to a camera configured to capture a zone of a premises proximate the security sensor; detecting with an activity sensor activity occurring within the zone; receiving at a microcontroller a first interrupt from the activity sensor responsive to detection by the activity sensor of the activity within the zone proximate the security sensor; and responsive to receiving at the microcontroller the first interrupt from the activity sensor, placing the processor in an awake state, signaling the camera to capture a set of images, and receiving and processing the image data including the set of images.

In this or other aspects, the security sensor may additionally or alternatively include one or more of the following features: upon placing the processor in the awake state, polling, with the processor via a communications bus, the microcontroller for any events that occurred during the sleep state; determining a motion detection event occurred; receiving image data including set of images at the processor from the camera and processing the image data; responsive to the processor receiving the image data from the camera, caching the image data in a non-transitory memory; retrieving using a receiver the image data cached in the non-transitory memory; transmitting the image data to a security sensor relay for transmission to a security server accessible via the Internet; that a battery power supply, the camera when idle, the activity sensor when monitoring, the microcontroller, the processor when in a sleep state, the non-transitory memory, and the transceiver when idle, collectively draw a current of less than or equal to 50 micro amps; storing state data in a non-transitory memory integrated with the microcontroller; upon placing the processor in the awake state, retrieving using the processor the state data from the non-transitory memory integrated with the microcontroller; operating the processor on a sleep cycle; and routinely waking the processor from the sleep state using a sleep timer based on an expiration of a sleeping period; that the sleeping period is predetermined or dynamically set; that the activity sensor is a motion sensor configured to detect motion of a moving object within the zone; that the motion sensor is a passive infrared sensor. In another innovative aspect, a method comprises: placing an image sensor of a security sensor in an inactive state, the image sensor positioned to capture images of a zone proximate the security sensor; receiving a user-initiated interrupt or an activity-sensor-initiated interrupt from a microcontroller at the image sensor; capturing using the image sensor a set of image frames of a potential threat within a zone proximate to a security sensor; sending images including the set of image frames to a processor; and transmitting using a wireless transceiver the image data via a wireless connection to a security relay station. The method may additionally or alternatively include one or more of the following features: sensing using a light sensor to determine available light within the zone; determining that a flash was not triggered during capture of the set of image frames based on the available light; triggering flash to alert potential threat in the zone that the set of images frames were captured; retrieving image sensor settings from the microcontroller; and configuring the image sensor using settings.

Other embodiments of one or more of these aspects or other aspects include corresponding systems, apparatus, and computer programs, configured to perform the various actions and/or store various data described in association with these aspects. These and other embodiments, such as various data structures, are encoded on tangible computer storage devices.

The technology described herein provides numerous advantages including maximizing battery life of security sensors while automatically detecting security threats, automatically generating motion images of the threats and securely pushing them to the mobile devices of the stakeholders for review and assessment. The technology further advantageously provides the stakeholders convenient countermeasure options for remediating the threats, providing hardware that is easy for users to install and configure themselves, providing hardware that can be installed in any building, which allows renters, lessees, and owners alike to secure the buildings they live and work in, etc. It should be understood that the foregoing advantages and benefits are provided by way of illustration and that numerous additional advantages and benefits are contemplated and encompassed by the scope of this disclosure.

It should be understood that the language used in the present disclosure has been principally selected for readability and instructional purposes, and not to limit the scope of the subject matter disclosed herein.

BRIEF DESCRIPTION OF DRAWINGS

The disclosure is illustrated by way of example, and not by way of limitation in the figures of the accompanying drawings in which like reference numerals are used to refer to similar elements.

FIGS. 6A-6E depict example global variables that a microcontroller and a memory preserves during a sleep cycle of a processor.

DETAILED DESCRIPTION

Figure 1:
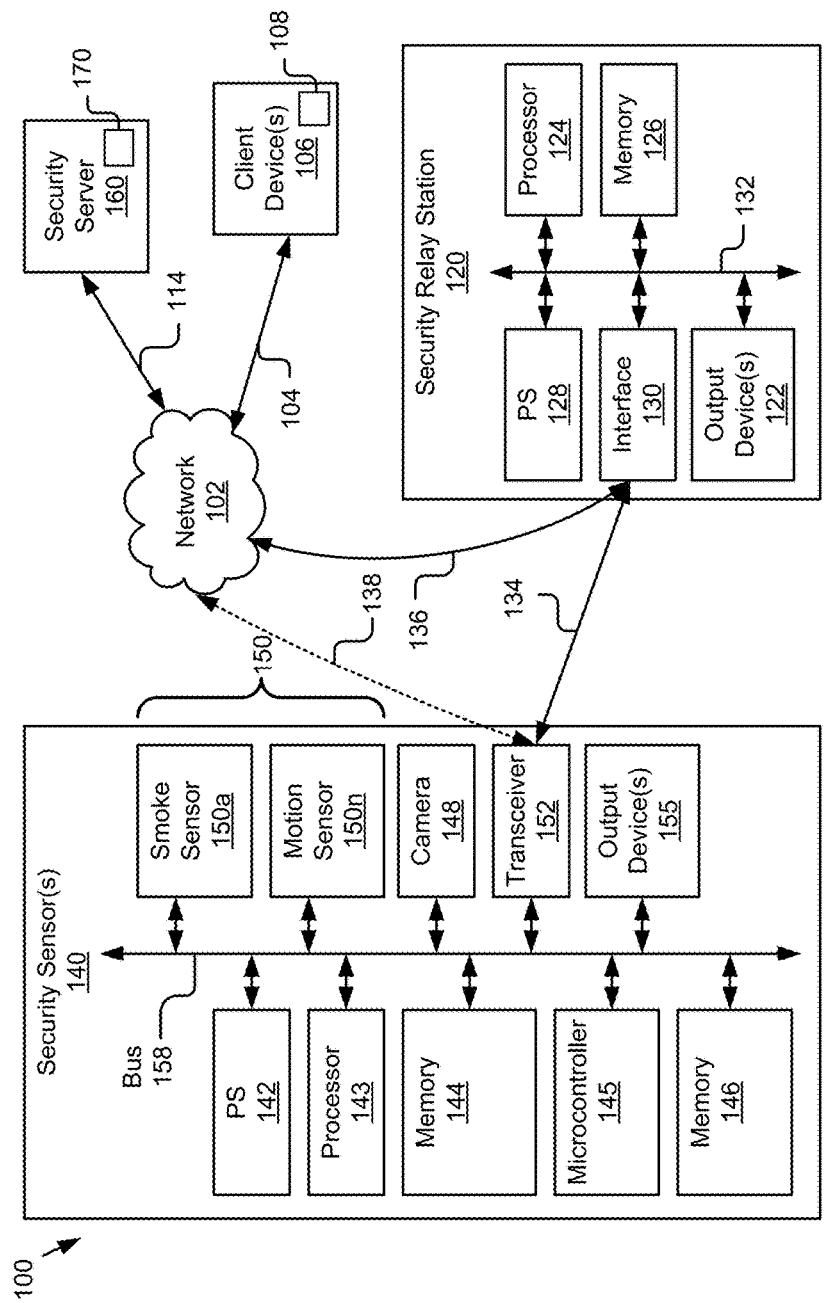
FIG. 1 is a block diagram illustrating an example security system environment.

FIG. 1 is a block diagram illustrating an example security system environment 100. The environment 100 may include one or more security installations. Ideally, a multiplicity of users install the security installations in various premises that they wish to monitor for security threats. A security installation may include a security relay station 120 (also called a security gateway, a security base station, etc.) that is linked to a set of one or more security sensors 140. As shown, the illustrated environment 100 further includes client device(s) 106 and a server 160, which are electronically communicatively coupled via a network 102 for interaction with one another, the security relay station(s) 120, and security sensors 140, etc., using standard networking protocols, as reflected by signal lines 104, 114, and 136. In a typical installation, security sensor(s) 140 are coupled for electronic communication with the security relay station 120 as reflected by signal line 134. In further embodiments, the security sensor(s) 140 may be coupled directly to the network 102 as reflected by signal line 138.

A security sensor 140 is configured to automatically detect security threats, capture image(s) of those threats, and relay the image(s) to the security relay station 120 that the security sensor 140 is linked to. The security relay station 120 is configured to manage the set of security sensors 140, and to exchange data with the management engine 170 of the server 160. Users register with the security service embodied by the management engine 170, which enables them to remotely configure and interact with their respective security installations, and to receive security notifications automatically as threats are detected by their respective security installations.

In an example security installation, a stakeholder, such as a resident or a landlord, of the premises may install a relay station within the premises (e.g., an office, the kitchen, etc.). The relay station 120 may be connected to the network 102 (e.g., the Internet) via a modem and/or a router that is also installed at the premises, or may be wirelessly connected to the network 102 using a cellular connection. This connection to the network 102 allows the relay station to communicate with other elements of the environment, such as the server 160 and one or more client devices 106. Within range of the relay station 120, the stakeholder installs corresponding security sensors 140 in one or more zones that are to be monitored (e.g., the entrance, living room, kitchen, washroom, rear entrance, etc.). Using a security application 108, the stakeholder registers security sensors 140 with the relay station 120 and the server 160, so that when the security sensors 140 are powered on they can communicate and exchange data with the relay station 120.

When armed, the security sensors 140 can detect the presence and/or movement of an object (e.g., person) within the corresponding zones, capture image(s) of the person within a given zone, and relay those image(s) (e.g., series of images) to the security relay station 120, which in turn, relays the image(s) via the network to server 160. A management engine 170 operable by the security server 160 can receive the images and generate a notification including the image(s) and provide it to an instance of the security application 108 operating on the client device 106 (e.g., mobile device) of the stakeholder who may be in a location different from that of the premises, and the security application 108 may alert the stakeholder and display the notification including the image(s) (e.g., as a video or motion image) captured by the security sensor 140 along with a user-selectable countermeasure options, such as "call 911", "alert another user", "turn on alarm", etc. The management engine 170 may embody a remotely accessible security service. In further examples, the smoke detector 160 may trigger the capture of images of a given zone upon detection of smoke within that zone.

The security system has numerous advantageous as noted throughout this document. For instance, its architecture minimizes current consumption by the sensors 140. For example, among the numerous novel methods described herein, the sensor 140 is configured to put the transceiver (and other components) in deep sleep while the processor 143 is sleeping, and save the state of transceiver's radio (and the other components) so it does not have to reboot when reactivated (saving power). Additionally, wakeup currents are also relatively low so in the event of a reboot, minimal power is used. The system 100 may also be configured to store longer-term information on the security relay station 120, which may be powered by the power grid and not necessarily a battery, which reduces the memory requirements (and thus power requirements) of the sensor(s) 140. Additionally, computationally expensive image processing may be performed on the relay station 120, the server 150, or the client device 106, thereby limiting the power needed to process the images. Many additional benefits and advantages are also possible as discussed further elsewhere herein.

Further, sensor units that can trigger the capturing of the images and generation of a notification may include an accelerometer in the relay station 120 or the security sensor 140, a moisture detection unit for detecting moisture (e.g., flood, leaks, etc.) included in or electronically coupled to the sensor 140, aperture (door, window, etc.) switches for detecting the opening/closing of a door that are electronically coupled to a sensor 140, a glassbreak detector that is electronically coupled to the sensor 140, or other security sensor units. For instance, the sensor 140 may wake up and take a picture and/or video on demand when tripped by a smoke detection event or glass break event or movement of one or more of the devices of the security installation. These sensor units may be directly wired to the sensor 140 or wirelessly connected (e.g., using the protocols discussed herein).

The example security sensor 140 depicted in FIG. 1 includes a power supply (PS) 142, the processor 143, the memory 144, the microcontroller 145, the memory 146, a set of sensors (e.g., the smoke sensor 150a, the motion sensor 150n, etc.), the camera 148, a transceiver 152, and output device(s) 155. The components 142, 144, 145, 146, 148, 150, 152, and 155 are communicatively coupled via a communications bus 158.

The security relay station 120 acts as an intermediate server that communicates with both the remote sensor(s) 140 and the web-services provided by the server 160. The security relay station 120 receives data from the sensor(s) 140 managed by it, processes that data in some cases, and relays the data to the server 160. The information from the server 160 may be pushed to the security relation station 120 or may be provided responsive to a request (polling) by the security relay station 120. The security relay station 120 may store sensor settings for each sensor 140 managed by it in the memory 126 and provide it to the sensor(s) 140 upon request.

An end user using an instance of the security application 108 may change settings using an interface presented thereby, and the security application 108 may synchronize those changes with the security installation by sending them to the management engine 170 of the server 160, which may store the settings in a data store in association with the user and the security installation, and relay them to the security relay station 120. The security relay station 120 may update a state file for each applicable sensor 120 in the memory 126. Upon receiving a check-in signal from the sensor(s) 140 of the security installation, the security relay station 120 relays the instruction to change the settings. The processor 143 receives the instructions and instructs the microcontroller 145 to update the settings. In some embodiments, the new settings are updated in the memory 144.

As shown in FIG. 1, the security relay station 120 may include output device(s) 122, a processor 124, a memory 126, a power supply (PS) 128, and an interface 130. The components 122, 124, 126, and 128 are communicatively coupled via a communications bus 134. In some embodiments, a security relay station 120 includes a communications device of communicating with a multiplicity of sensors, such as the interface 130, a communications device of communicating with the server 160 and computing devices 106 (e.g., a personal mobile device), such as the interface 130), a non-transitory memory device for buffering and storing messages, commands, responses, and measured data, such as the memory 126, a power source (e.g., PS 128), a mechanism to upgrade/change firmware versions, an audio reproduction unit for playing sound bites that would be audible to living things within earshot of the gateway (e.g., the output device(s) 122), a microphone for recording sound bites (e.g., a microphone), computer-executable instructions (e.g., software/firmware (e.g., a sensor management module) stored in the memory 126 and executable by the processor 124) for setting up/registering, managing the sensor(s) 140, and/or interacting with the server 126, etc.

Figure 2:
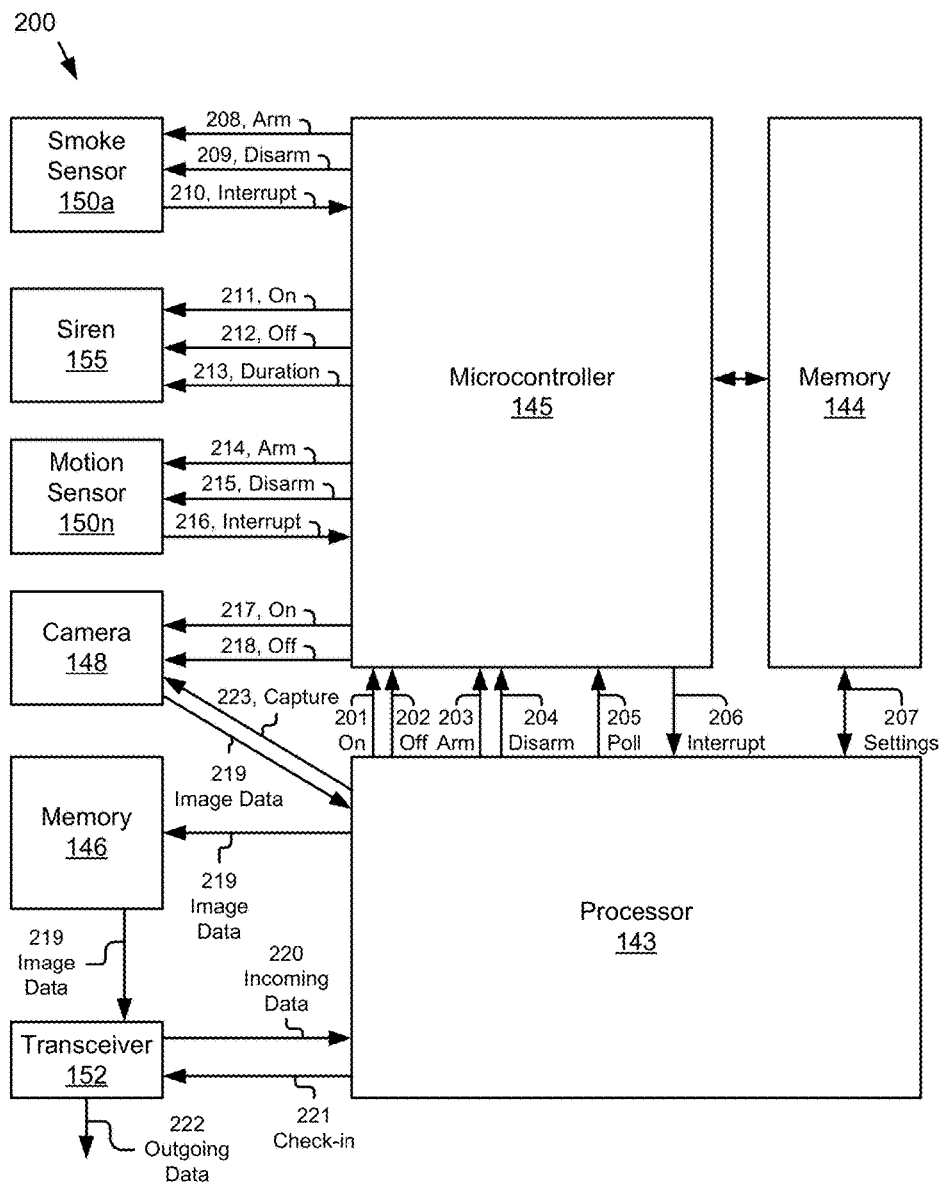
FIG. 2 is a block diagram of an example architecture of a security sensor.

A further example architecture 200 of the security sensor 140 is depicted in FIG. 2, although it should be understood that some of the hardware components (e.g., PS 128) are not shown so as not to obscure the described aspects and that other suitable variations to the architecture are also possible and encompassed hereby.

As shown in FIG. 2, the sensor 140 uses a two-tier microprocessor control system. The first tier processor, the processor 143, is a primary processor and controls the high-level functioning of the security sensor 140. The second tier processor, the microcontroller 145, is an ultra-low power peripheral interface controller (PIC) that includes memory that maintains a persistent state through deep sleep. The microcontroller 145 controls the lower-level peripherals and functions (e.g., the sensors 150, the siren 155, battery level polling, etc.). A non-limiting example of the processor 143 is a SAM4S Cortex™-M4 processor-based microcontroller by Atmel™, although it should be understood that other processors suitable to carry out the acts and functionality discussed herein are also possible and contemplated. An non-limiting example of the microcontroller 145 is a PIC18(L)F2X/4XK22 made by Microchip™, although it should be understood that other processors suitable to carry out acts and functionality discussed herein are also possible and contemplated.

The microcontroller 145 can monitor interrupts received by the sensors 150 while operating in a low-power mode and the processor 143, which uses more power than the microcontroller 145 when active, can be put into a deep sleep (also just called a sleep), which allows the security sensor 140 to achieve superior battery life relative to existing solutions. The ultra-low sleep/energy state of processor 143 while in the deep sleep mode limits the current drain from the battery, thus increasing the life of the sensor 140's battery. In other words, the two-tier microprocessor system consumes a very low amount of power (e.g., in some ideal embodiments less than 1 μamp, about 1-10 μamps, and/or about 10-100 μamps, but also including 100 μamps-100 milliamps or other ranges depending on the implementation and power requirements, during inactive periods) to maintain the system without requiring system reconfiguration or recalibration of the system when returning to a wakened, executional state. It should be understood that the term about or substantially means the current may be within 2-5 units of the described amount or range. In some embodiments, the collective components of the sensor 140 (e.g., the battery power supply 142, the camera 148 when idle, the activity sensor(s) 150 when monitoring, the microcontroller 145, the processor 143 when in a sleep state, the memory 146, and the transceiver 152 when idle) draw a current less than or equal to 10 μamps.

By way of example but not limitation, using 4 AA NiMH rechargeable batteries, the security sensor 140 can achieve 1-2 years under typical conditions, which is advantageous as it alleviates stakeholders from having to constantly charge batteries or requiring the sensor 140 to be installed near a power source, making it easily mountable and suitable for rental units, extended stay suites, and other shorter duration stays, although other applications also apply and are contemplated.

As discussed further elsewhere herein, the processor 143 wakes up from the low energy state periodically (e.g., every 3, 4, 5, 6, 10, 12, etc.) seconds and checks in with the relay station 120 to see if there are any requests/commands. In some instances, this process can take about 20 ms, although it is contemplated that this could be shorter or longer. If the processor 143 receives any requests/commands from the relay station 120, the sensor processes them and reports back to the relay station 120 with appropriate data. If there are not any, the processor 143 goes back to sleep.

When disarmed, the processor 143 ideally places all possible the components 145, 148, 150, 155, etc., in sleep or off state as appropriate. When armed, the processor 143 wakes/arms the applicable activity sensors 150 (e.g., the motion sensor 150n and/or the smoke sensor 150a). In some embodiments, the sensors 150 even when activated are in a low power detection mode to preserve power. If motion or smoke is detected, a wake up interrupt wakes up the processor 143, as discussed further herein, which in turn activates the camera/image sensor 148 (e.g., warms up and snaps a set of images (e.g., 1-5, etc.) via the microcontroller 145 pictures. Similarly, in an embodiment where the sensor 140 includes a sound capture device (e.g., microphone), the microcontroller 145 may trigger the image capture process if the sound levels are higher than an acceptable threshold and the security sensor 140 is armed. Other variations are also possible and contemplated.

The microcontroller 145 and the processor 143 may be coupled via a portion of the communications bus 158. The processor 143 may signal the micro controller 145 via the bus 158 to execute certain actions, such as turn various devices on or off, arm or disarm various devices, etc. For instance, as shown the processor 143 may send the microcontroller 145 and on signal 201, and off signal 202, an arm signal 203, and a disarm signal 204. Additionally, the processor 143 may poll 205 the microcontroller 145 for any events that may have occurred while the processor 143 was sleeping, which may include motion detection events, smoke detection events, noise events, other sensor events, power supply events, hardware failure events, etc. For instance, in response to a motion detection event, the processor 143 may signal the microcontroller 145 to activate the camera 148, and the processor 143 may receive and processes the image data including set of images from the camera 148 in response. In some instances, the processor 143 polls the microcontroller 145 responsive to receiving an interrupt 206.

In further embodiments, the security relay station 120 may include an accelerometer to detect movement of the security relay station 120. The processor 124 is coupled to the accelerometer and monitors the readings thereof. If the readings indicate that the security relay station 120 is being picked up, it may send a notification to the server 160 of the movement, and the server 160 may send a notification to the security application to notify the user of the movement (e.g., via a push notification, interface presented on the device, an electronic message, etc.).

FIGS. 10A-10D are schematic diagrams depicting an example communications bus 158 that couples the processor 143 and the microcontroller 145. As shown, SIO_D and SIO_C 1002 comprise an I2C bus which connects the processor 143 to the microcontroller 145. The PIC-_TO_SAM_WAKEUP 1004 is a line connecting the processor 143 and the microcontroller 145. The microcontroller 145 can send a wakeup signal/interrupt via the PIC_TO_SAM_WAKEUP 1004 to wake up the processor 143. It is noted that the schematics depicted in FIGS. 10A-10D are provided by way of example that that other suitable bus configurations are also contemplated and encompassed by this document.

The processor 143 may store and retrieve settings 207 in the memory 144 associated with the microcontroller 145, as discussed further elsewhere herein. In some embodiments, the memory 144 is embedded in the microcontroller 145, although it should be understood that in other cases, the memory 144 may be separate from but coupled to the microcontroller 145 and the processor 143, provided the power consumption and performance of the memory is similar.

As noted above, the microcontroller 145 controls the peripheral components of the sensor 140. Example peripheral components are depicted in FIGS. 1 and 2, although it should be understood that other peripheral components are also possible and contemplated, as discussed elsewhere herein. In the depicted embodiment, the microcontroller controls the smoke sensor 150a, the siren 155, the motion sensor 150n, the camera 148, etc.

For example, the microcontroller 145 can signal the smoke sensor 150a to arm 208 and to disarm 209, and to the motion sensor 150n to arm 214 and to disarm 215. Responsive to detecting activity within the zone being monitored, the smoke sensor 150a can send an interrupt signal 210 to the microcontroller 145 indicating that it has been tripped, and the motion sensor 150n can send an interrupt signal 216 to the microcontroller 145 indicating that it has been tripped. As depicted, in some embodiments microcontroller 145 may configure the settings of smoke sensor 158 and/or the motion sensor 150n by storing various settings (e.g., operational parameters) in the memory of the smoke sensor 150a and/or the motion sensor 150n, and or setting corresponding registers thereof. The microcontroller 145 can signal the siren to turn on 211 and turnoff 212. In addition, microcontroller 145 can send a duration signal to the siren 155 indicating a duration for which the siren should emit sound once turned on. This duration can be stored in a register of the siren 155 in some embodiments, although other variations are also possible and contemplated.

The microcontroller 145 can turn the camera 148 on and off by sending it an on signal 217 and an off signal 218 to turn it on and off, respectively. When turning it on, the microcontroller 145 and/or the processor 143 can send the camera 148 operational settings to configure the function and performance of the camera 148. For instance, the processor 143 (or the microcontroller 145 in some embodiments) can signal the camera 148 to capture one or more images by sending a capture 223 signal. When the image sensor of the camera 148 captures image data, it sends the image data 219 to the processor 143, which in turn caches the image data 219 in the memory 146 for transport to the security relay station 120. For instance, the transceiver 152 retrieves the image data 219 from the memory 146 and sends it to the security relay station 120 as outgoing data 222. Additionally, the transceiver 152 sends incoming data 220 to the processor 143 (e.g., responsive to a check-in 221).

Figure 3A:
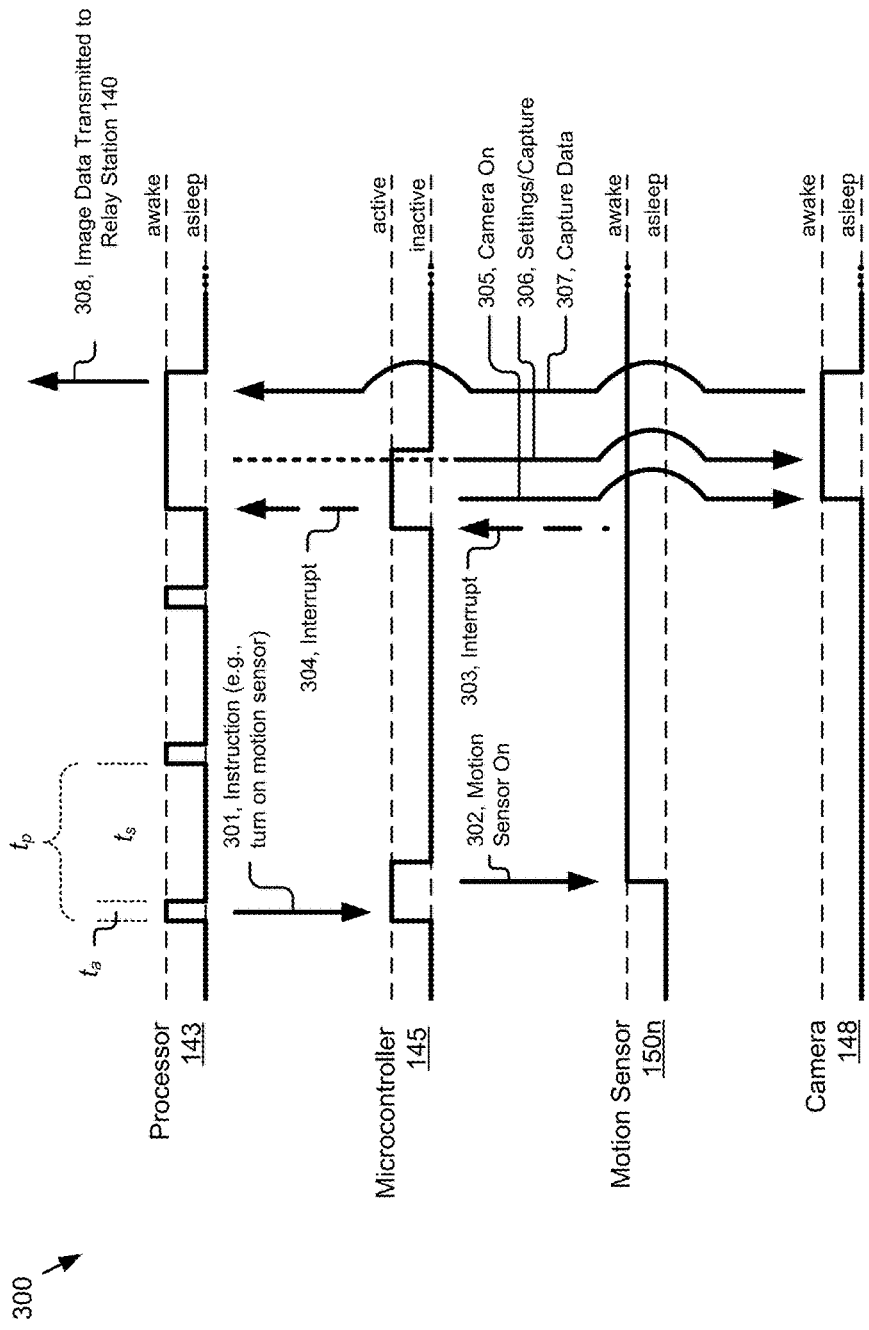
FIG. 3A is a signal diagram of an example method for waking a processor.

FIG. 3A is a signal diagram of an example method 300 for waking the processor to capture image data responsive to a detection event by a motion sensor 150n. As shown, the processor sleeps and awakes according to a schedule. In this example, the processor 143, which is power hungry relative to at least some of the other components of the security sensor 140, is asleep to the extent possible to preserve power. As discussed below, the processor 143 wakes up periodically to perform various tasks (e.g., re-enable the power supply to keep the processor 143 alive, take a picture, turn on the siren 155, receive information about an event (e.g., motion detected by the motion detector 150n), etc.).

The time $t_p$ illustrates an example periodicity of the sleep cycle, which includes an active time $t_a$ during which the processor 143 is active and a sleep time $t_s$ during which the processor 143 is sleeping. In this embodiment, the camera 148 is coupled to a battery power supply (e.g., PS 142) to receive power, and an activity sensor 150 (e.g., the motion sensor 150n) is coupled to the battery power supply to receive power and is configured to detect activity within a zone proximate the security sensor.

In the embodiment depicted in FIG. 3A, the processor, during $t_a$, sends an instruction signal 301 to the microcontroller (e.g., to turn on the motion sensor 150n). In an example, this could be responsive to a user enabling the motion sensor 150n in an instance of the security application 108 operating on his/her client device 106, state settings received from the security relay station 120 upon power on, or the like. After sending the signal 301 to the microcontroller 145, the processor 143 sleeps.

Responsive to receiving the signal 301 from the processor 143, the microcontroller 145 sends an on signal 302 signaling the motion sensor 150n to turn on. The motion sensor 150n switches from a sleep/off state to an awake/on state and begins monitoring the zone proximate the security sensor for movement.

After a period of time, the motion sensor 150n detects a motion event and sends an interrupt 303 to the microcontroller 145, which upon receiving the interrupt 303, sends a corresponding interrupt 304 to the processor 143 to wake the processor 143. In this example, the processor 143 is awakened during its usual sleep cycle responsive to the detection by the motion sensor 150n of a motion event. As discussed elsewhere herein, responsive to receiving the interrupt 304, the processor 143 can poll the microcontroller 145 for any new events to determine the reason for the interrupt and then act accordingly.

Further, the microcontroller 145 turns on the camera by sending a camera on signal 305 to the camera 148, which, upon receiving the signal 305, awakes. The processor 143 and/or the microcontroller 145 may then send one or more commands/settings 306 (e.g., capture command, configuration parameters, etc.) to the camera 148 which the camera uses to configure and/or control itself. Then the camera 148 captures image data including a set of images of the zone being monitored and sends the capture/image data 307 to the processor 143, which is now awake responsive to the interrupt 304 and which relays 308 the image data for transmission to the security relay station 120.

Figure 3B:
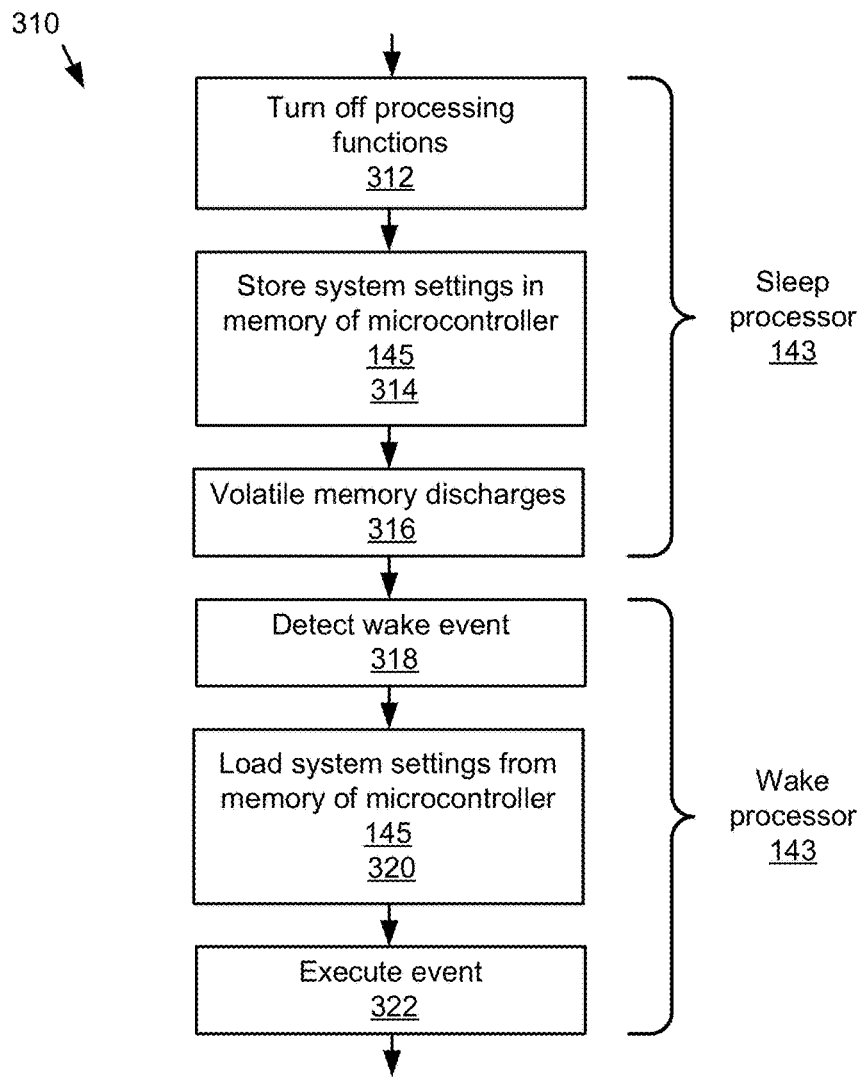
FIG. 3B is a flowchart of an example method for operating a processor on a sleep cycle.

FIG. 3B is a flowchart of an example method 310 for operating the processor 143 on a sleep cycle. As discussed elsewhere herein, the sleeping period of the cycle may be predetermined or dynamically set in some cases. In block 312 of the method 310, the processing functions of the processor 143 are turned off, various system settings are stored 314 in the memory of the microcontroller 145, and the volatile memory of the processor 143 largely discharges 316 because the amount of voltage supplied to its internal memory is substantially reduced. Powering down the volatile memory of the processor 143 is advantageous because it preserves battery life. The system settings (e.g., state of the system, user-defined characteristics (e.g., arm/disarm state, PIR sensitivity level, smoke detection on/off, radio power, provisioning information) are stored in the memory (e.g., flash memory) of the microcontroller.

In block 318, a wake event is detected. For example, a sensor-initiated interrupt is received by the processor 143 or a sleep timer was triggered based on the expiration of a sleeping period. Responsive to the wake event, the processor 143 is placed in an awakened state and retrieves and loads 320 system settings (e.g., state data, etc.) from the memory 144 of (e.g., integrated with) the microcontroller 145, and the processor 143 executes 322 the event (e.g., takes picture(s) using the camera 148, triggers a notification to the user, etc.).

Figure 4:
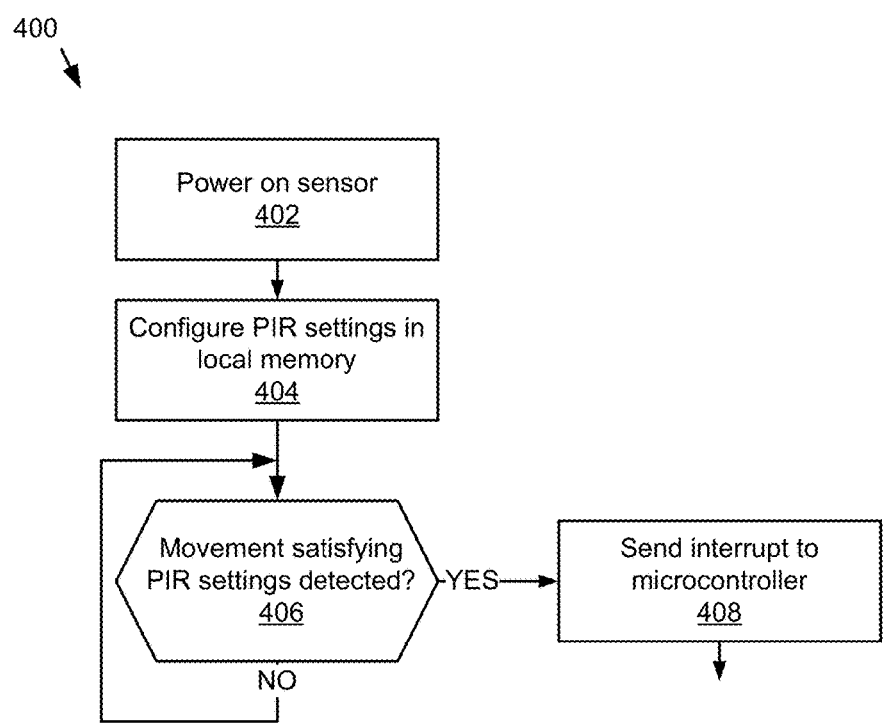
FIG. 4 is a flowchart of an example method for detecting a motion event using a motion sensor.

FIG. 4 is a flowchart of an example method 400 for detecting a motion event using a motion sensor 150n. In the description of this method 400, a passive infrared sensor is used, although it should be understood that other sensors that are capable of detection motion are also possible and contemplated, and that the method is also suitable for other types of sensors that detect conditions (e.g., light, smoke, noise, vibration, etc.).

In block 402, the microcontroller 146 powers the passive infrared sensor (PIR) sensor responsive to receiving a corresponding instruction from the processor 143. In block 404, the microcontroller 145 configures the settings of the PIR sensor in the local memory of the PIR sensor. The settings may, in some cases, include a sensitivity threshold. In block 406, the PIR sensor determines whether a movement it detected satisfies the settings (e.g., sensitivity threshold), and if so, in block 408, the PIR sensor sends an interrupt to the microcontroller 145 notifying the microcontroller 145 of the motion detection event.

Figure 5A:
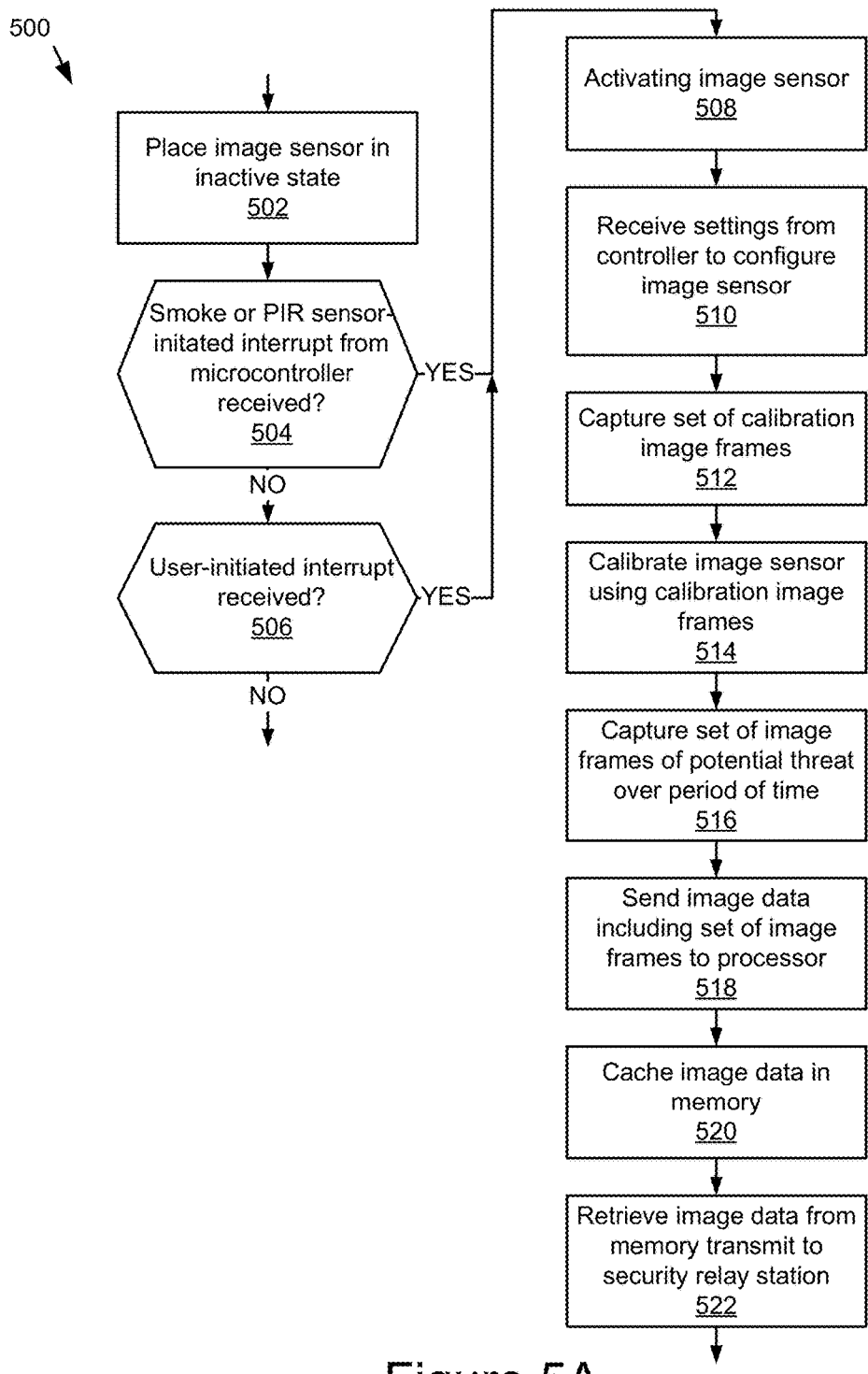
FIG. 5A is a flowchart of an example low-power method for capturing a set of images.

FIG. 5A is a flowchart of an example low-power method 500 for capturing a set of images. In block 502, the processor 143 of the security sensor 140 is placed in a sleep/inactive state. In block 504, if the processor 143 receives an activity sensor-initiated interrupt, the processor 143 activates the image sensor 148 via the microcontroller 145 in block 508. For example, if the microcontroller 143 receives an interrupt from the motion sensor 150n or the smoke sensor 150a (after detecting activity occurring within the zone being monitored), then the microcontroller 145 sends an interrupt to the processor 143. Alternatively, in block 506, if the processor 143 receives a user-initiated interrupt (as relayed from the server 160 to the sensor 140 by the relay station 120), the processor 143 activates the image sensor 140 via the microcontroller 145 in block 508.

In block 510, the image sensor 148 receives one or more configuration settings from the microcontroller 145 and/or the processor 143. In some embodiments, the microcontroller 145 and/or the processor 143 configures the registers of the image sensor 148 to set its operational parameters. In some further embodiments, the image sensor 148 may receive and process the settings and set its own parameters. In some embodiments, the image sensor 148 is already configured and block 510 may be skipped.

In block 512, responsive to receiving a capture command, the image sensor 148 captures a set of calibration image frames. The image sensor 148 of the processor 145 may, in block 514, use the calibration image frames to calibrate the operational parameters of the image sensor 148, such as aperture settings, focal length, and whether to trigger the flash during capture, etc.

In block 516, the image sensor 148 captures a set of image frames over a period of time of the potential threat within the zone of the premises being monitored. Responsive to the set of image frames being captured, the image sensor 148 sends, in block 518, image data including a set of image frames to the processor 143, which is in an awake state and receives and processes the image data including the set of images.

In block 520, the processor 143 processes the image data by at least caching it in the memory 146 and block 520, and the transceiver 152 retrieves the image data from the memory and transmits it to the security relay station 122. The security relay station 122 receives the image data related to the server 160 for communication to the user via the security application 108, as discussed elsewhere herein. To optimize power savings, processing by the processor 143 of the image data may be minimized by shifting any computationally expensive image processing requirements to other devices such as the security relay station 120, the server and 160, and/or the client device 106.

In some embodiments, while the processor 143 is caching the image data in the memory 146, the transceiver simultaneously retrieves it from the cash and transmits it. In these embodiments, the memory 146 is acting as a staging area for the image data, and once it is safely transmitted to the security relay station 122, the image data may be wiped from the memory 146. However, having it cached in the memory 146 is advantageous should any of the packets of image data being transmitted by the transceiver 152 to the interface 130 of the security relay station 122 become corrupted or lost, as those packets of image data can conveniently be retrieved and transmitted again. By way of example, the memory 146 may be configured to store up to a certain number of images (e.g., 3, 4, 5, etc.) while awaiting transport, etc., although it should be understood that any number of images required may be stored.

Figure 5B:
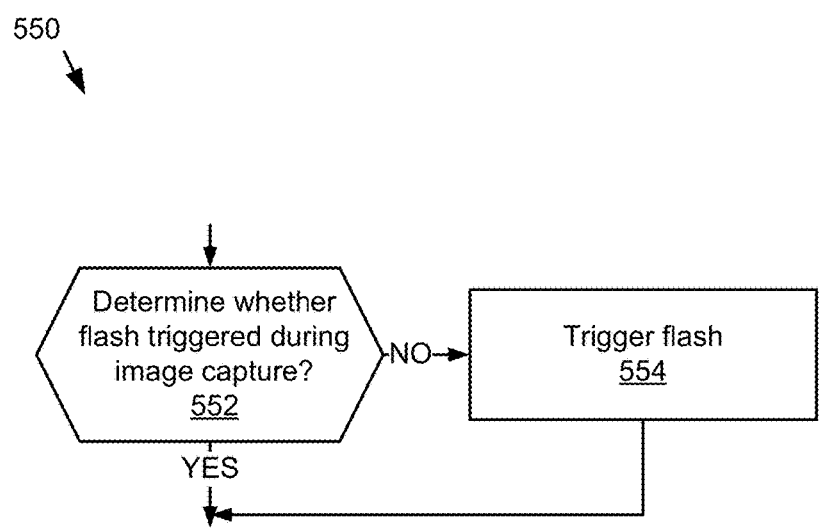
FIG. 5B is a flowchart of an example method for force flashing the flash of the camera to alert a potential intruder.

FIG. 5B is a flowchart of an example method 550 for force flashing the flash of the camera 148 to alert a potential intruder. In block 504, the camera 148 and/or the processor 143 determines whether the flash triggered during the image capture of block 518. If the flash did not fire during the capturing of the images and block 518, the camera 148 fires/triggers 554 the flash after the capturing of the images. This is beneficial as it repurposes the flash as an alert beacon alerting a potential intruder that their presence has been detected, as well as signaling to a stakeholder (e.g., homeowner, etc.) that a picture has been taken for security reasons.

In some embodiments, the camera 148 can determine whether to fire the flash when capturing a certain set of images at a certain time by evaluating the available light in the zone being monitored using a light sensor (e.g., Lux sensor, photodiode, etc.). The camera 148 and/or the processor 143 can read the level detected by the light sensor, compare it to previously determined light thresholds (e.g., high, medium, low, etc.), and determine to fire the flash if the light level is at or below a certain one of thresholds (e.g., med, low, etc.). Therefore, if the ambient light in the room is sufficient to capture a photo without the flash, the camera 148 will capture the set of images, and then trigger the flash after the images are captured. Alternatively, the camera 148 may trigger the flash before the set of images are captured at a point early enough that the flashed light has dissipated and does not affect the set of images being captured.

If it is determined that the flash is needed during image capture, the camera 148 and/or the processor 143 may internally calibrate and adjust the flash (e.g., LED(s)) are internally calibrated and adjusted to light up for only the optimal length of time in order to illuminate the scene as necessary while still preserving battery life. For example, if during a comparison between the light level reading and the predetermined thresholds, it is determined that a low amount of light is available in the zone being monitored, the flash may be calibrated to light up for longer than if a medium amount of light is determined to be available in the zone being monitored. Thus, daytime pictures may use less flash and battery power than those taken in a dark room.

With reference again to FIGS. 1 and 2, the buses 134 and/or 158 can include a communication bus for transferring data between components of a computing device or between computing devices, a network bus system including the network 102 or portions thereof, a processor mesh, a combination thereof, etc.

The transceiver 152 includes a wireless interface configured to communicate with the security relation station 120, and or other components of the network 102. In some embodiments, the transceiver 152 of the sensor 140 may include a wireless transceiver configured to transmit data via a meshwork network made up of a plurality of sensors 140 and a security relay station 120. By way of further example, the transceiver 152 may transmit data to the relay station 120 to which it is linked using a protocol compliant with IEEE 802.15, such as Zigbee®, Z-Wave®, Bluetooth®, or another suitable standard. Conversely, the interface 130 of the relay station 120 may transmit data to the sensor 140 using a corresponding protocol. In further embodiments, one or more of the sensor(s) 140 and the relay station 120 of an installation be coupled to the network 102 (e.g., the internet via Wi-Fi™) for communication with one another using protocols discussed elsewhere herein. Additionally or alternatively, one or more of the sensor(s) 140 and the relay station 120 of an installation may be wired for direct communication and the wired components may exchange data using wired data communication protocols. Further embodiments are also possible and contemplated.

In some embodiments, the transceiver 152 of a sensor may include an adjustable power radio transmitter that adapts signal power according to distance from the security relay station 120 and signal strength required. This prolongs the battery life of the sensor so that a sensor 140 near a relay station 120 does not waste extra battery power to transmit signals to the relay station 120 while simultaneously allowing a sensor 140 located further away from the relay station 120 to still communicate reliably therewith. In addition, the adjustable power radio transmitter is a good neighborly wireless device because it can limit the amount of signal noise produced when signaling to only what is necessary to maintain a reliable connection to the relay station 120, thereby dramatically reducing excess signal noise that other networking hardware devices emit indiscriminately.

In some embodiments, the transceiver 152's radio's throughput is set to a certain threshold (e.g., 250 kbps) allowing the radio to consume very low power, while still maintaining the ability to transmit pictures over the RF line. In conjunction with the other power saving features discussed herein, the security sensor 140 can, by way of example, operate for more than a year without requiring charging or a battery change.

In some embodiments, the relay station 120 (and/or sensor(s) 140) may typically communicate via the network 102 via a WLAN, but when a power surge occurs or the connection to the network 102 (Internet) is disrupted in some way, the relay station 120, as a fallback, may couple to and transmit data via the network 102 using a connection to a data network (e.g., WWAN) of a mobile network (e.g., via a 3G, 4G, 5G, etc.). In these embodiments, the relay station 120 may include a backup battery that allows it to continue operating even though wired power to the device(s) was interrupted.

The interface 130 can transmit and receive data to and from other hardware components and computing devices to which they are coupled. The interfaces 130 may be coupled (wiredly, wirelessly, etc.) to other hardware and/or the network 102 to communicate with other entities forming the network 102. In some embodiments, the interface 130 may include one or more wireless transceivers for exchanging data with the transceiver 152 and other components of the environment 100 using one or more wireless communication methods, including TCP/IP, HTTP, HTTPS, WebSockets, IEEE 802 (e.g., 802.11, 802.15, IEEE 802.16, etc.), dedicated short-range communications (DSRC), or other suitable wireless communication methods as discussed elsewhere herein. In some embodiments, the interface 130 can include a cellular communications transceiver for sending and receiving data over a cellular communications network including any generation (3G, 4G, 5G+, etc.) mobile network.

In some embodiments, the interface 130 of the relay station 120 of a given installation is coupled to the network 120 (e.g., the Internet) and thereby further coupled to the server 160 to exchange data with the management engine 170 operable thereby, as discussed elsewhere herein.

In some embodiments, the interfaces 130 and/or 152 may include one or more ports for direct physical connection to the network 102 or to another communication channel. For example, the interfaces 130 and/or 152 may include a USB, SD, CAT-type, Thunderbolt, or similar ports for wired communication with other hardware, such as memory devices, computers, etc. For instance, the interfaces 130 and/or 152 may include a removable memory card slot configured to receive a compatible solid-state memory card storing data and/or software executable by the relay station 120 to perform various acts and/or functionality as discussed elsewhere herein. For instance, the memory 126 and/or 146 may resemble a removable type memory coupled to the interfaces 130 and/or 152, respectively, although further embodiments are also contemplated where the security relay station 120 and/or security sensor 140 additionally or alternatively includes more permanent memory devices.

The output device(s) 122 and/or 155 may include one or more devices for relaying information. In some embodiments, the output device(s) may include auditory or visual output devices 155 for communicating with and/or alerting people, such as lights, audio reproduction units (e.g., speakers), a visual display (e.g., an e-ink display, LED display, touchscreen, etc.), etc. As a further example, the output device(s) may include the siren 155 or buzzer, a flash or strobe light, and/or the like, for alerting nearby individuals that a security alarm has been triggered, an intercom or speaker for relaying voice communications for notifying an individual (e.g., an intruder) that countermeasures have been taken and/or demanding an individual (e.g., an intruder) leave the premises, etc.

In some embodiments, the output device(s) 122 and/or 155 may play one or more sound bites audible to living things within earshot of the sensor 140. In this example, the sound bites (e.g., various siren notices, warnings, etc.) could be pre-installed by the manufacturer or may be user-defined. For instance, the user may record a sound bite using a feature of the security application 108 in conjunction with a microphone of the client device 106, and the security application 108 may upload the sound bite to the management engine 170, which in turn, may transmit the sound bite to the security relay station 120 and/or the security sensor(s) 140 for storage and playback. The user could additionally or alternatively record the sound bite using a sensor (e.g., microphone) of the security relay station 120 and/or the security sensor(s) 140. In this example, the sensor may include a button selectable by the user to initiate the sound bite recording process provided by the processor 143, which may capture and store the sound bite on the memory 146 and/or 126 for later playback. Other variations are also possible and contemplated. In some cases, different sound bites for different situations (e.g., fire detection, CO detection, intruder detection, etc.) may be used.

As discussed elsewhere herein, the microcontroller 145 and/or the processor 143 may be programmed with/executes computer logic (e.g., a detection, capture, and processing module) to interpret the signals and determine, based on the signals, whether any security threats exist, as discussed elsewhere herein.

In further examples, the security relay station 120 and/or security sensor(s) 140 may include a hardware button selectable by a user to disarm the security installation. For instance, if an administrative user (e.g., parent) is not available, a child (e.g., who may not have access to a computer (e.g., client device 106) but knows where the relay station 120 is located may disarm the security installation by pressing a button or series of buttons (e.g., entering a pin), etc.

The camera 148 includes a digital image capture device capable of capturing still and motion images, and sound. The camera 148 is coupled to the bus 158 for communication and interaction with the other components of the sensor 140. The camera may include a lens for gathering and focusing light, a photo sensor including pixel regions for capturing the focused light and a processor for generating image data based on signals provided by the pixel regions. The processor may be integrated with the microcontroller 145 and/or the processor 143 of the sensor 140 or may be separate therefrom. In some embodiments, the processor of the camera 148 is coupled via the bus 158 to store image data in the memory 146. The photo sensor may be any type of photo sensor including a charge-coupled device (CCD), a complementary metal-oxide-semiconductor (CMOS) sensor, a hybrid CCD/CMOS device, etc. The camera 148 may include a microphone (not shown) for capturing sound or may be coupled to and interact with a microphone included as a sensor 150 of the sensor 140. The camera 148 may also include any conventional features including flash, a zoom lens, etc.

As a further non-limiting example illustrating the operation of the camera 148, responsive to a trigger event, the camera 148 of the security sensor 140 captures a series of images (e.g., 3-5), which are then transmitted to the relay station 120 and the server 160. When more than one image is captured, it comprise a motion image or may be combined into a motion image, such as an animated GIF or HTML5 video. These images may be combined at any point during the transmission from the security sensor 140 to the client device 106, which displays the combined images to the user. For example, hardware and/or software logic executed by the camera 148, the microcontroller 143, the processor 146, the processor 124, the server processor, or a processor of the client device 106 may generate the motion image, although not performing the processing using the components of the security sensor 140 is advantageous from a power-saving perspective. In further variations, the images may be uncombined and transmitted and/or displayed to the user in separate form and/or flipped through by the user as such.

In some embodiments, the camera 148 is programmed to be in deep sleep for periods of inactivity in the monitored zone (which may extend for days, weeks, etc.) to maintain battery life. By way of example, the image sensor/camera 148 can be activated with an interrupt from the microcontroller when motion, smoke, or other conditions are detected while the system is armed or when the user requests an image on demand, as discussed elsewhere herein. Sleeping the camera in this way is advantageous as it conserves considerable battery life relative to keeping the camera in an awake state.

When the sensor is activated, the camera immediately begins a self-calibration routine capturing several frames of picture/video and self-stabilizing to optimize its register settings. The camera 148 may capture any number of images over a set period of time at pre-configured intervals, and may be calibrated/optimized as discussed elsewhere herein. In some embodiments, the processor 143 may configure the camera 148 by setting various registers of the camera 148. The registers may also be optimized using calibration frames captured prior to the primary capture of image data of the detected anomaly.

In further embodiments, the memory 146 may store a camera driver comprising software executable by the microcontroller 145 and/or the processor 143 to control/operate the camera 148. For example, driver may be executable by the microcontroller 145 and/or the processor 143 for signaling the camera to capture and store a still or motion image and controlling the flash, aperture, focal length, etc., of the camera 148. The detection, capture, and processing module may interface with the driver (e.g., using APIs) to capture still and/or motion images using the camera 148. In some further embodiments, the driver may be included in the detection, capture, and processing module.

The activity sensor(s) 150 (or just sensors 150) include various sensors for detecting sound, motion, temperature, light, heat, gas, vibration, etc. The signals from the sensor(s) 150 may be received and interpreted by the detection, capture, and processing module to determine if a threat is posed, as discussed elsewhere herein. In some embodiments, the sensor(s) 150 may include passive infrared (PIR) sensors, photodetectors, luminosity sensors, heat detectors, pressure sensors, optical detectors, electrochemical sensors, audio sensors (e.g., sound detector, microphone, level meters, etc.), thermocouples, etc.

In some embodiments, one or more motion sensors 150*a* sensors may be included in the security sensor 140 to detect motion of objects within the field of view of the PIR sensor.

In some embodiments, the motion sensor(s) 150*a* are PIR sensor(s), although other motion sensors are applicable. The PIR sensor may have a certain detection range and angle. A non-limiting example range may be about 0-50 ft and a non-limiting example detection angle may be about ±50 degrees, although other ranges and angles are also possible (e.g., about 5-45 ft, about 0-30 ft, about 0-100 ft, about ±30, 45, 49, 90 degrees, etc.), etc.

The PIR sensor(s) may have a configurable switching threshold that be from between 0% and 100%. The microcontroller 145 (e.g., in cooperation with other components) may configure the switching threshold by sending a threshold (re)setting instruction to the PIR sensor(s). Additionally or alternatively, the PIR sensor(s) may include a hardware element (e.g., switch, potentiometer, button, etc.) for a user to manually set the threshold. In some embodiments, a 0% or no switching threshold may be set and the microcontroller 145 may determine or utilize user-determined and/or predetermined switching thresholds for triggering a security threat, as discussed elsewhere herein.

User-adjustable settings for the PIR may be stored as system settings in the memory 126, 144, etc. Selecting this component for motion detection allows the security sensor 140 (e.g., the two-tier microcontroller control system) to stay in deep sleep mode while the PIR sensor is always on. When a trip event occurs or motion is detected, the PIR sensor will send an interrupt to the processor 143 via the microcontroller 145 to enable all of the system commands and settings needed to take pictures, enable the siren, and notify the user, etc. In some embodiments, the PIR can provide digital output to the microcontroller 145 and includes registers that can be programmed and tuned to adjust sensitivity, as discussed elsewhere herein.

The PIR sensor(s) may be coupled to the bus 158 to transmit signals to the microcontroller 145 and/or the processor 143, which executes computer logic (e.g., the detection, capture, and processing module) to interpret the signals and determine, based on the signals, whether any security threats exist, as discussed elsewhere herein.

The smoke sensor 150 is configured to detect the presence of smoke within the monitored zone. In some embodiments, for ultra-low power consumption, a two-part optical smoke sensor 150 is used that comprises an LED and photodiode to detect the presence of smoke. In some embodiments, the smoke sensor 150 includes chamber for smoke to enter into. One side of the chamber includes an infrared emitter and an opposing side includes an infrared detector. The emitter and detector are angled with respect to each other so that when the chamber is void of smoke the detector is unable to see the light coming from the emitter. When smoke enters the chamber, it causes the light from the emitter to refract and find a path to the detector.

The smoke sensor 150a also includes an integrated microcontroller to process and check for air quality, smoke, self-test and other functions. This microcontroller is coupled to the emitter and detector. When the detector detects light from the emitter (i.e., detects the smoke), it signals the microcontroller, which, in turn, signals the alarm, and notifies the microcontroller 145 about the threat. This allows security sensor 140 to stay "aware" of potential threats while the processor 143 and the microcontroller 145 are in a sleep state to prolong battery life. This is further accomplished without the security sensor 140 becoming uncalibrated.

As discussed elsewhere herein, in a typical scenario, the sensor 140 operates on battery power, and as a result, conserving energy used by the sensor 140 during monitoring becomes increasingly important to reduce the need by the user to replace or charge the battery. When active, the PIR sensor requires a consistent (e.g., continuous, pulse, etc.) electrical current for operation. Even though the current is typically extremely low (e.g., 1.6 mA@3.3V), regulating the current with a power regular can consume more power than desired and reduce the standby duration of the battery. For instance, the power regulator, when stepping down the power to the required current for the PIR sensor consumed significantly more power (e.g., 3×, 4×, 5×, etc.) than the PIR sensor itself.

Advantageously, the PS 142 includes a set of one or more capacitors downstream of the power regulator and upstream of the PIR sensor, as discussed below with reference to FIG. 7, for example. In this embodiment, the capacitor(s) collects power from the power regulator, and when the capacitor is fully charged, the power regulator shuts off (thus conserving power), and the PIR sensor receives current from the capacitor instead of directly from the power regulator. When the amount of charge in the capacitor starts to get low, the power regulator turns back on and recharges the capacitor, as discussed further below.

Figure 7:
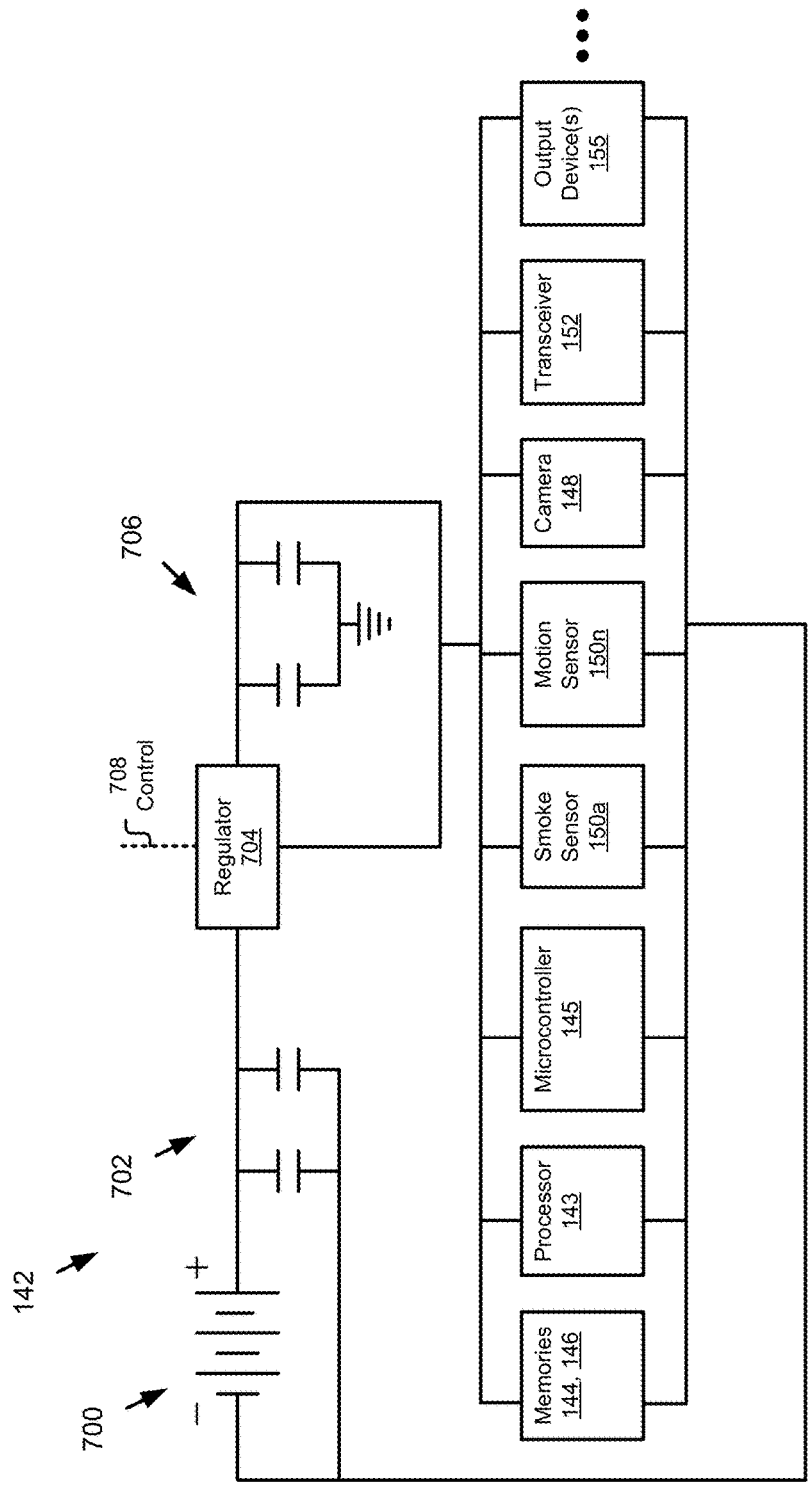
FIG. 7 is a block diagram illustrating an example layout of a PS.

FIG. 7 is a block diagram illustrating an example layout of the PS 142. As shown, the architecture includes a battery 700, a power regulator 702 connected to the battery 700 downstream of the battery 700, a first set of capacitors 706 connected downstream of the power regulator 704 and providing power to the processor 143 and the microcontroller 145, and the other components 144, 146, 150a, 150n, 148, 152, 155, etc., and a second set of capacitors 702 situated upstream of the regulator 702 and downstream of the battery 700. The configuration depicted in FIG. 7 further allows the security sensor 140 to prolong battery life.

The battery 700 may include any suitable battery or array of batteries. The batteries may be rechargeable or conventional disposable batteries. Operating solely on battery power is advantageous because it enables the security sensor 140 be mounted virtually anywhere without having to plug the security sensor 140 into a fixed power source (e.g., a correctional electrical plug). It is noted that in addition or as an alternative to the battery, other native power sources may be utilized, such as a solar cell, and/or wireless-charging technologies (inductive charging, etc.) may be employed to power the sensors 140 without departing from the scope of this disclosure.

During a charge cycle, the power regulator 704 is switched off until a low charge threshold of the first set of capacitors 706 has been reached, and once the low charge threshold has been satisfied, the power regulator 704 switches on to charge the first set of capacitors 706 until a high charge threshold has been reached.

Figure 8:
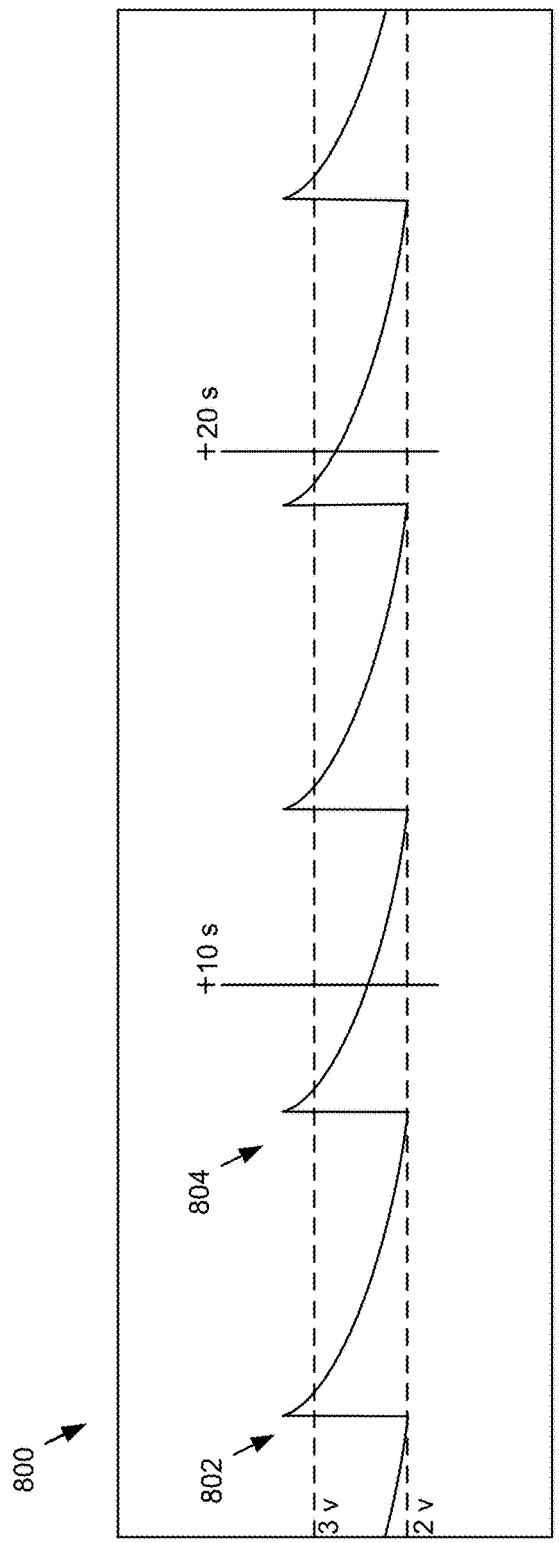
FIG. 8 is a signal chart illustrating an example charging cycle.

FIG. 8 is a signal chart illustrating the charging cycle 800 of the first set of capacitors 706. As shown, the first set of capacitors 706 store sufficient energy to power the system during a sleep cycle (e.g., over 3 volts, 4 volts, etc.). Current is drawn from the bank of capacitors 706 over time to maintain the sleep state of the security sensor 140. As the capacitor charge dissipates and the low threshold is reached (as monitored by the microcontroller 145), the power regulator 704 activates and charges the first set of capacitors 706, as shown by cycles 802 and 804.

The second set of capacitors 702 maintain the state of the power regulator 704 and allow the power regulator 704 to draw the requisite amount of current when powering on without impacting the battery 700. For example, The battery 700 may have an internal resistance, and when a larger amount of current needs to be drawn than the battery 700 can supply at a given point (switching on of the power regulator 702), the second set of capacitors 702 provide a reserve for that surge in current consumption by the power regulator 704.

Figure 11A:
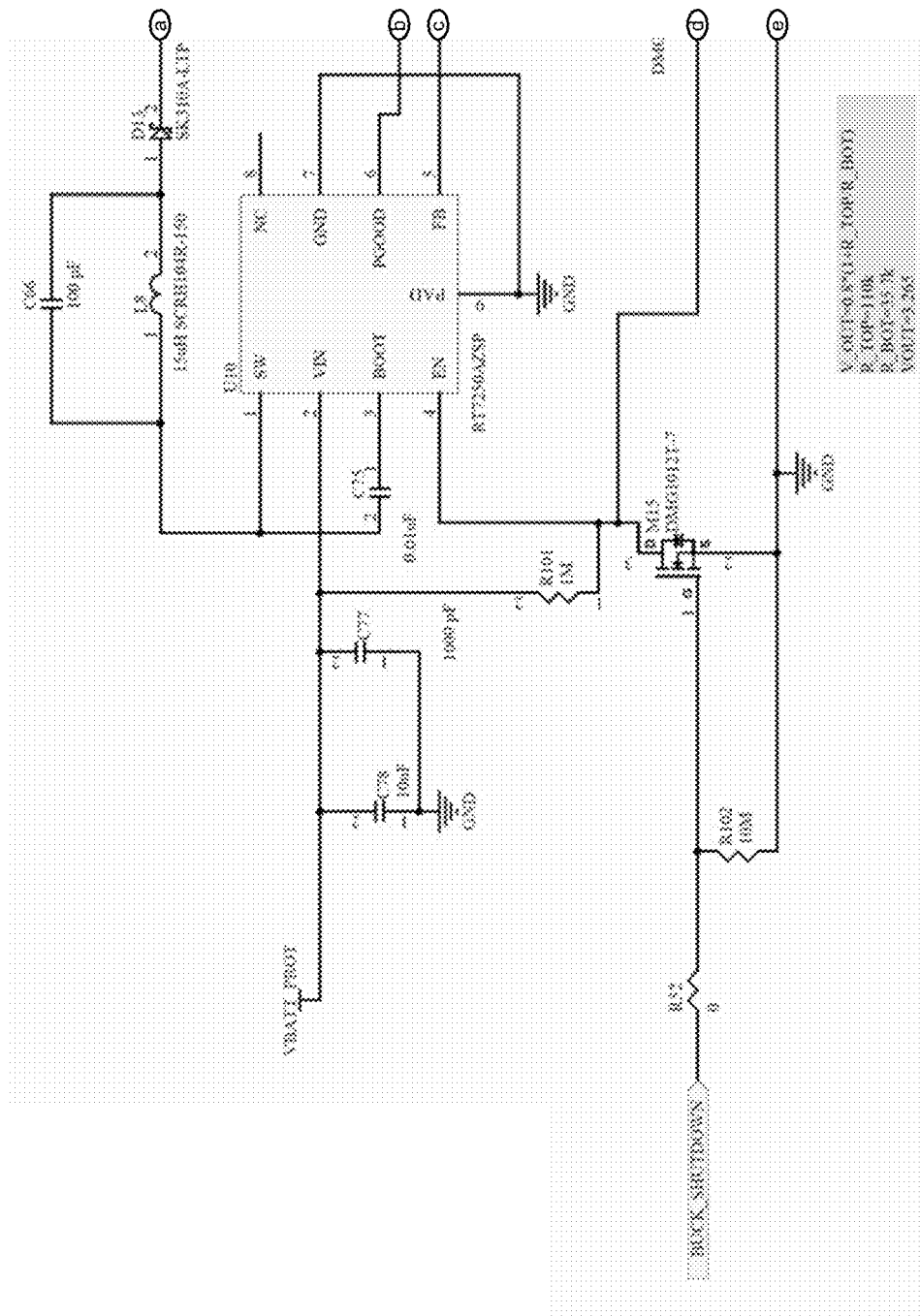
FIGS. 11A and 11B are schematic diagrams of an example PS.
Figure 11B:
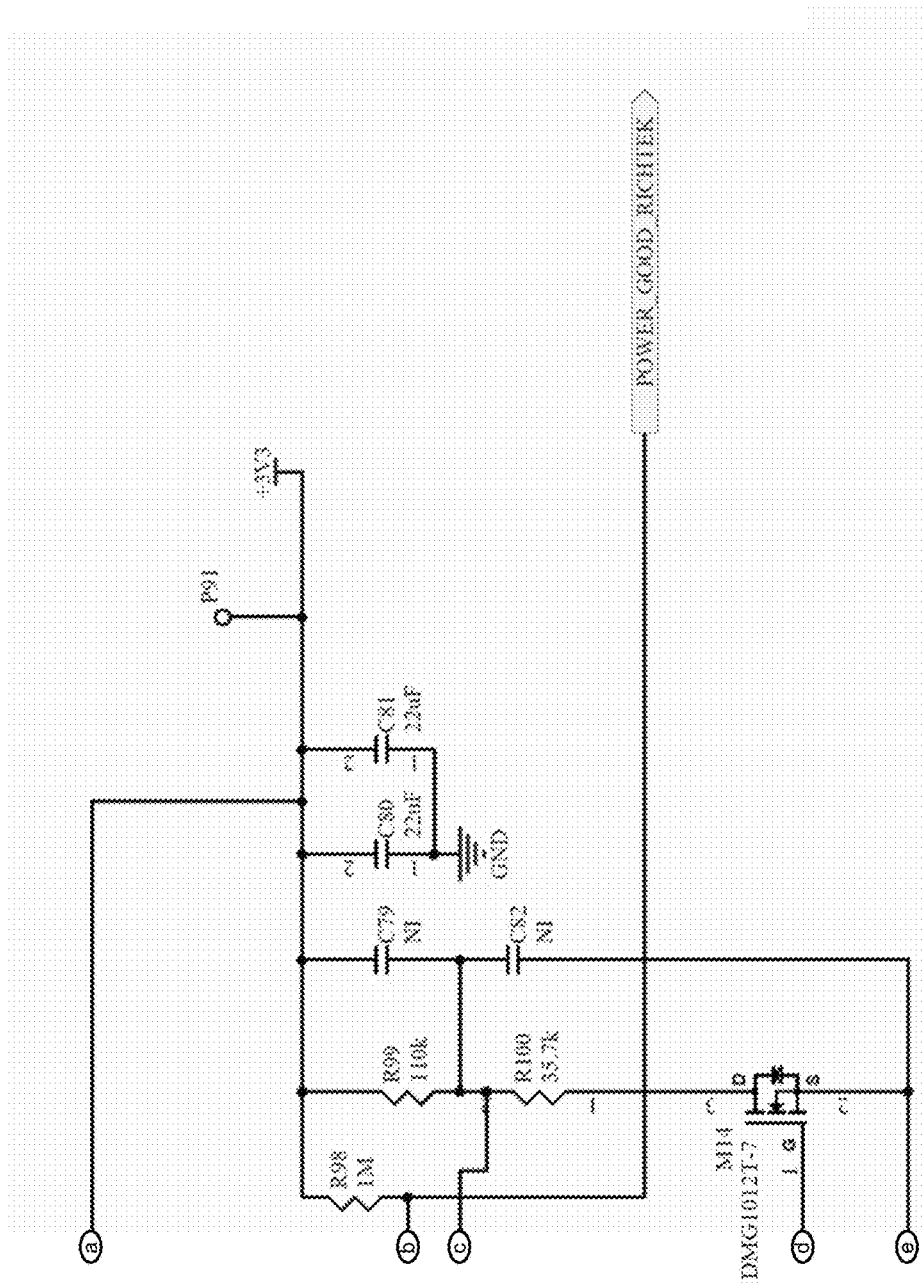

The power regulator 702 down-converts the voltage from that supplied by the battery 700 to the level that the microcontroller 145, the processor 143, and other system level components require. FIGS. 11A and 11B are schematic diagrams of an example PS 142. In the depicted architecture 1100, the power regulator includes a buck regulator configuration, although other variations are also possible and contemplated.

Using the power regulator 702 allows the sensor 140 to operate solely on battery power. However, while the power regulator 702 is running, it also consumes electricity. To reduce this current draw, the first set of capacitors 706 are placed downstream from the power regulator 702. The set of capacitors release current over time to the required components at the appropriate voltage allowing the power regulator 702 to be off for extended periods of time, particularly during idle periods (no detection or image capture events).

The PS 128 may include a regulated power supply (e.g., AC power supply), a transformer (AC/DC converter), one or more energy storage devices (e.g., a rechargeable batter(ies), non-rechargeable batter(ies)), wiring, etc., wireless charging units (e.g., inductive charging units (e.g., induction coils)). In some embodiments, the PS 128 may include regulated power supply that can be plugged into a fixed power source, such as a conventional logical plug, because the security relay station 120 may not need monitor a particular zone and therefore can be immediately placed next to any electrical outlet.

In some embodiments, an audio sensor may embody hardware for recording sound bites as discussed elsewhere herein, or may provide for intercom capability with other sensors and/or security applications 108 (via the network 102).

The client device(s) 106 (also referred to individually and collectively as 106) are computing devices having data processing and communication capabilities. In some embodiments, a client device 106 may include a processor (e.g., virtual, physical, etc.), a memory, a power source, a network interface, and/or other software and/or hardware components, such as a display, graphics processor, wireless transceivers, keyboard, camera, sensors, firmware, operating systems, drivers, various physical connection interfaces (e.g., USB, HDMI, etc.).

The client devices 106 may couple to and communicate with one another and the other entities of the environment 100 via the network 102 using a wireless and/or wired connection. Examples of client devices 106 may include, but are not limited to, mobile phones (e.g., feature phones, smart phones, etc.), tablets, smartwatches or other smart wearables, laptops, desktops, netbooks, server appliances, servers, virtual machines, TVs, set-top boxes, media streaming devices, portable media players, navigation devices, personal digital assistants, etc. In addition, while a single client device 106 is depicted in FIG. 1, it should be understood that any number of client devices 106 may be included.

The server 160 may include one or more computing devices having data processing, storing, and communication capabilities. For example, the server 160 may include one or more hardware servers, virtual servers, server arrays, storage devices and/or systems, etc., and/or may be centralized or distributed/cloud-based. In some embodiments, the server 160 may include one or more virtual servers, which operate in a host server environment and access the physical hardware of the host server including, for example, a processor, memory, storage, network interfaces, etc., via an abstraction layer (e.g., a virtual machine manager).

While not depicted, the server 160 may include a (physical, virtual, etc.) processor, a non-transitory memory, a network interface, and a data store 168, which may be communicatively coupled by a communications bus. Similarly, the client device 106 may include a physical processor, a non-transitory memory, a network interface, a display, an input device, a sensor, and a capture device. It should be understood that the server and the client device may take other forms and include additional or fewer components without departing from the scope of the present disclosure.

Software operating on the server 160 (e.g., the management engine 170, an operating system, device drivers, etc.) may cooperate and communicate via a software communication mechanism implemented in association with a server bus. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

As shown, the server 160 may include a management engine 170 embodying a remotely accessible security service. The management engine 170 may send data to and receive data from the other entities of the system including the security applications 108, a sensor management modules operable by the processor 124, and a detection, capture, and processing modules operable by the processor 143. The management engine 170 may be configured to store and retrieve data from one or more information sources, such as the data store 168. In addition, while a single server 160 is depicted in FIG. 1, it should be understood that one or more servers 160 may be included.

While not specifically shown, the server 160 may include a data store for storing and providing access to data. The data store may store data received from other elements of the environment 100 include, for example, a sensor management module executed by the processor 143, a detection, capture, and processing module executed by the processor 124, and/or instances of a security application 108 executable by the client devices 106, and may provide data access to these entities. For instance, the data store may store, among other data, images, motion images, user settings, user account information, electronic address information, security logs associated with security installations, any information received from other entities of the system, access logs, etc.

In some embodiments, the security application 108, management engine 170, security relay station(s) 120, etc., may require users to be registered to access the acts and/or functionality provided by them. For example, to access various acts and/or functionality provided by the security application 108, management engine 170, and/or security relay station(s) 120, these components may require a user to authenticate his/her identity (e.g., by confirming a valid electronic address). In some instances, these entities 108, 120, 160, etc., may interact with a federated identity server (not shown) to register/authenticate users. Once registered, these entities 108, 120, 160, etc., may require a user seeking access to authenticate by inputting credentials in an associated user interface.

In some embodiments, the management engine 170 may route the settings to the relay station 120 associated with the sensor(s) 140. For example, the relay station 120 may receive the settings from the management engine 170 via the network 102 using a suitable data transmission protocol, as discussed elsewhere herein, and the relay station 120 may store the settings in the memory 126 and relay (e.g., push) the settings to the appropriate sensors 140. In some instances, the settings may be applicable to all the sensors 140 of the security installation and the relay station 120 may generate and send corresponding settings instructions to each of the sensors 140. In some instances, the settings may only be applicable to a subset (e.g., fewer than all) of the sensors 140 of the security installation. In this case, the settings data received from the management engine 170 indicate which specific sensors 140 the settings are applicable to, and the relay station 120 may generate and send settings instructions to the sensors 140 specified in settings data.

In some embodiments, each sensor 140 that received settings instructions from the relay station 120 stores the settings data on a memory of the microcontroller 145, such as the memory 144. The detection, capture, and processing module uses these settings instructions to control the monitoring being performed by the sensor 140. In some embodiments, the settings instructions may be changes to existing parameters, thus effecting the performance of the sensor 140 with respect to those parameters.

Example settings/parameters may include, but are not limited to: the sensitivity of PIR Sensor; the length of buffer after the PIR Sensor detects an event (the buffer reflects the amount of time a user has to react before re-arming); a smoke detector setting enabling or disabling the smoke detector of a sensor 140 (which can preserve battery life); a LED Flash flag setting, which can, for example, be set to on all the time, off, scheduled on or off (e.g., day, time of day, etc.), on or off depending on the mount of light detected by a photon detector, etc.; a siren setting, which, for example, can be set to turn on when the sensor 140 is tripped, off all the time, delayed so when motion is detected it turns on after a certain specified, timeframe, etc. (the siren can also be activated on demand using the security application 108 or a hardware button the sensor 140 or relay station 120); various camera settings governing the operation of the camera 148 (additionally or alternatively to the foregoing flash settings), such as brightness, contrast, image size or resolution, FPS, or any other applicable camera setting; settings governing the operation of the transceiver 152 (e.g., a radio frequency transceiver), such as settings controlling the power level of the transceiver to fit the needs of the customer's installation environment, optimize battery life and signal strength, etc.

Additional acts, structure, and/or functionality of at least the client devices 106, the server 160, the security relay station(s) 120, the security sensor(s) 140, and their constituent components are described in further detail below.

It should be understood that the environment 100 illustrated in FIG. 1 is representative of one possible system, and that a variety of different system environments and configurations are contemplated and are within the scope of the present disclosure. For instance, various functionality may be moved from a server to a client, or between a security relay station 120 to a security sensor 140, or vice versa, etc., and some embodiments may include additional or fewer computing devices, services, and/or networks, and may implement various functionality on another device. Further, various entities of the environment 100 may be integrated into to a single computing device or system or additional computing devices or systems, etc. In further examples, the environment 100 may include one or more third-party servers (not shown) including an software application engines operable by the servers to provide various services such as social networking; email; blogging; micro-blogging; photo management; video, music and multimedia hosting, distribution, and sharing; cloud-based data storage and sharing; a combination of one or more of the foregoing services; or any other service where users retrieve, collaborate, and/or share information, which may be incorporated into the information being presented to the users via the security applications 108.

Figure 9:
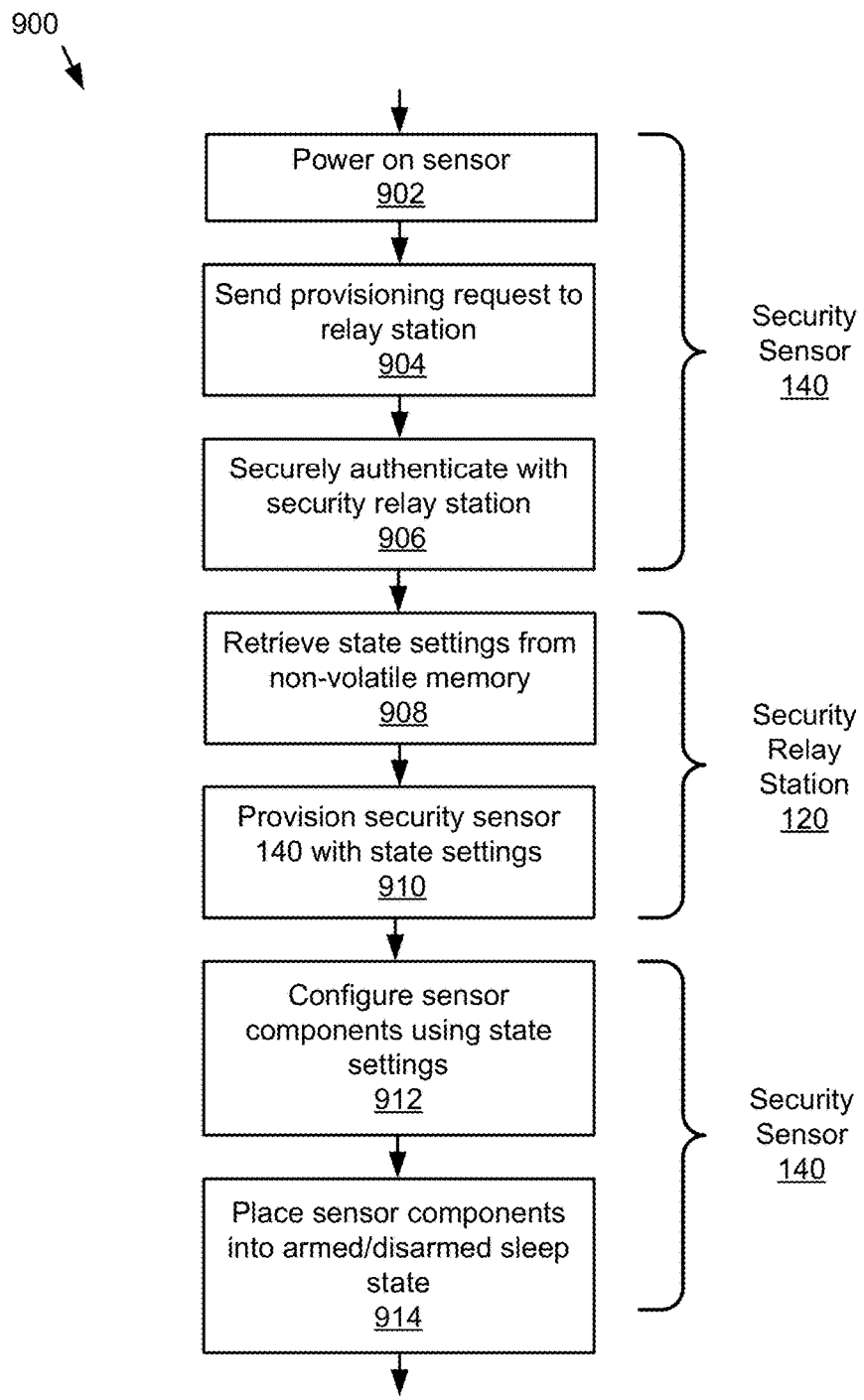
FIG. 9 is a flowchart of an example method for provisioning a low-power processing device.
Figure 10A:
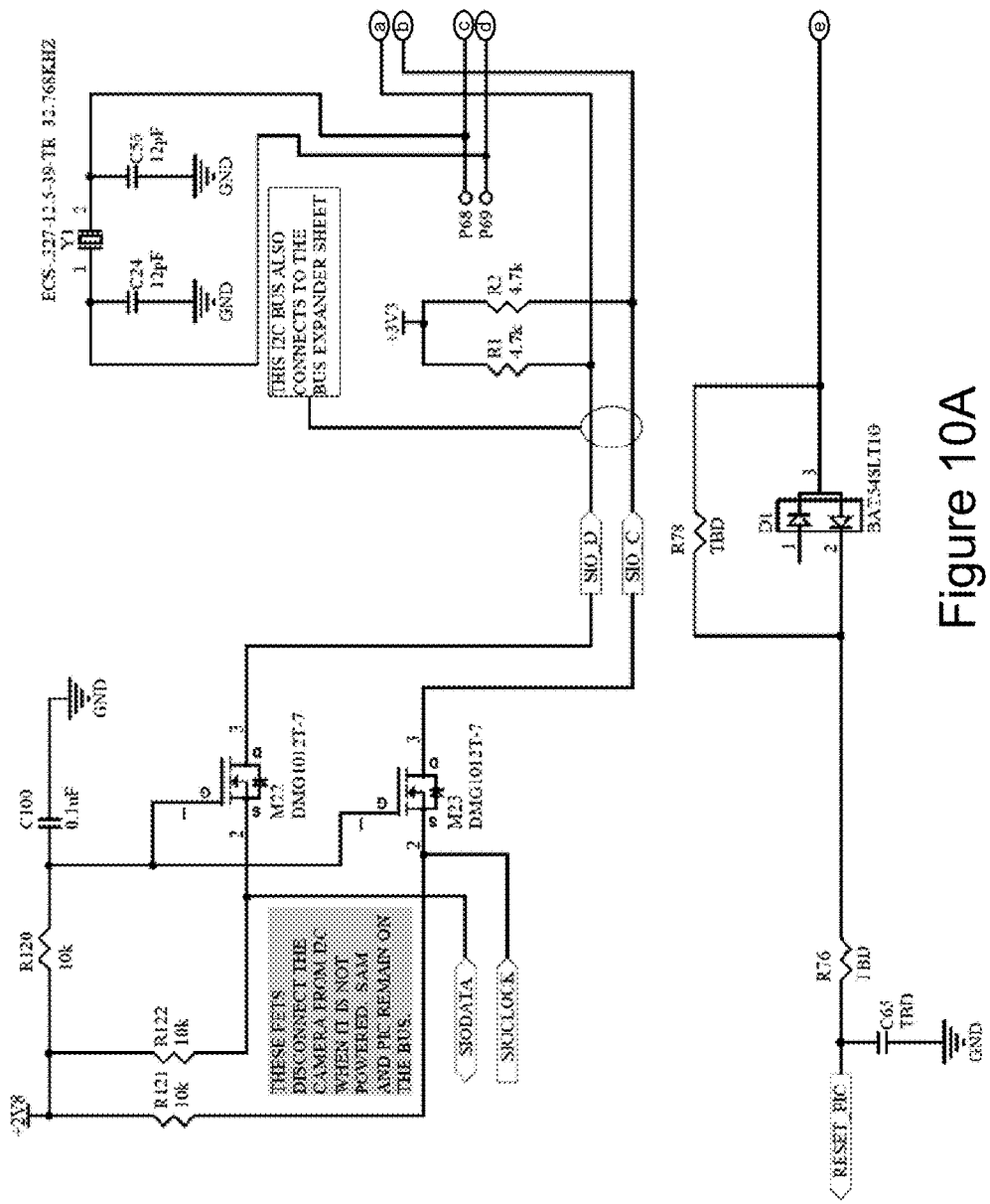
FIGS. 10A-10D are schematic diagrams depicting an example communication bus that couples a processor 143 and a microcontroller.
Figure 10B:
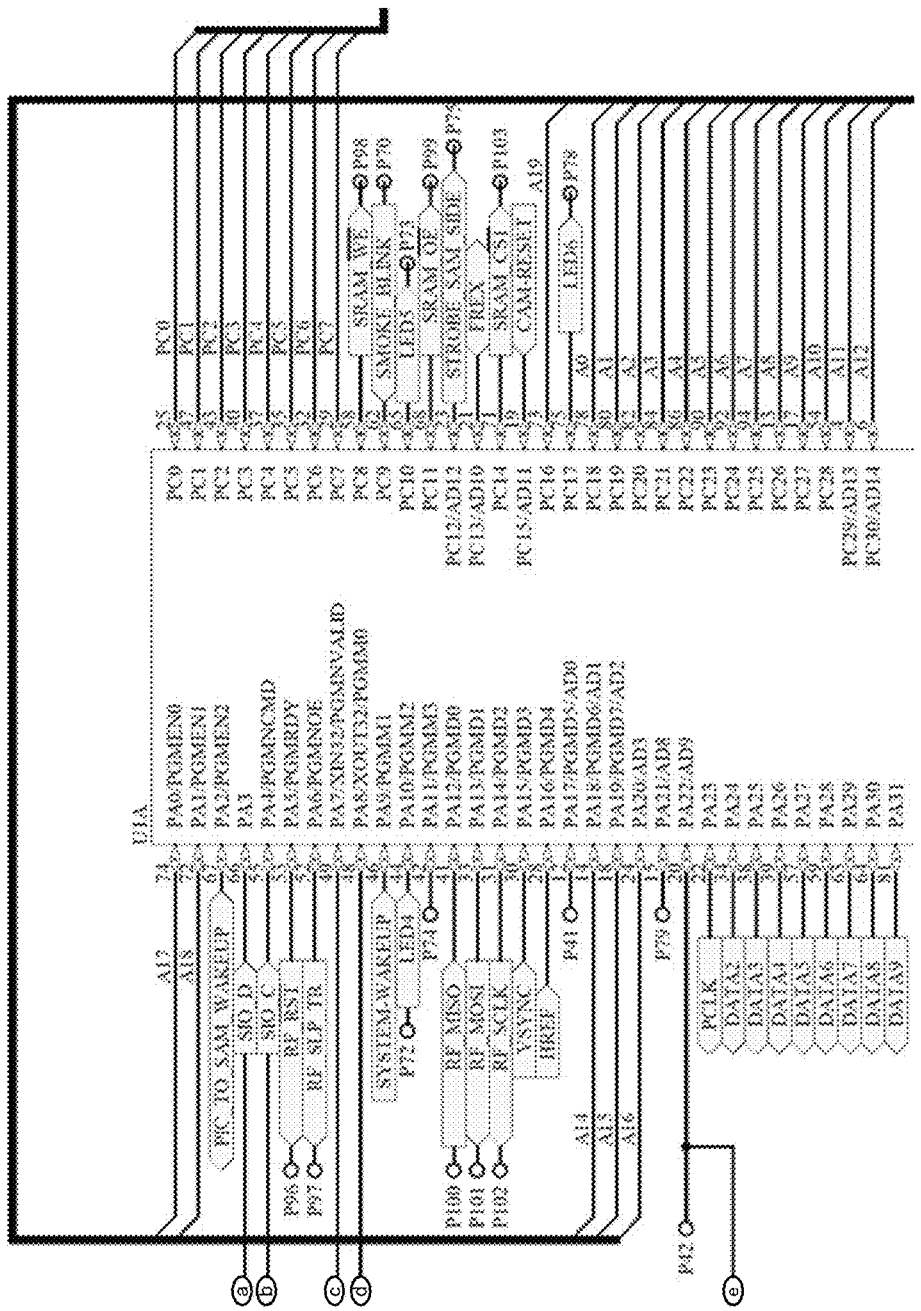
Figure 10C:
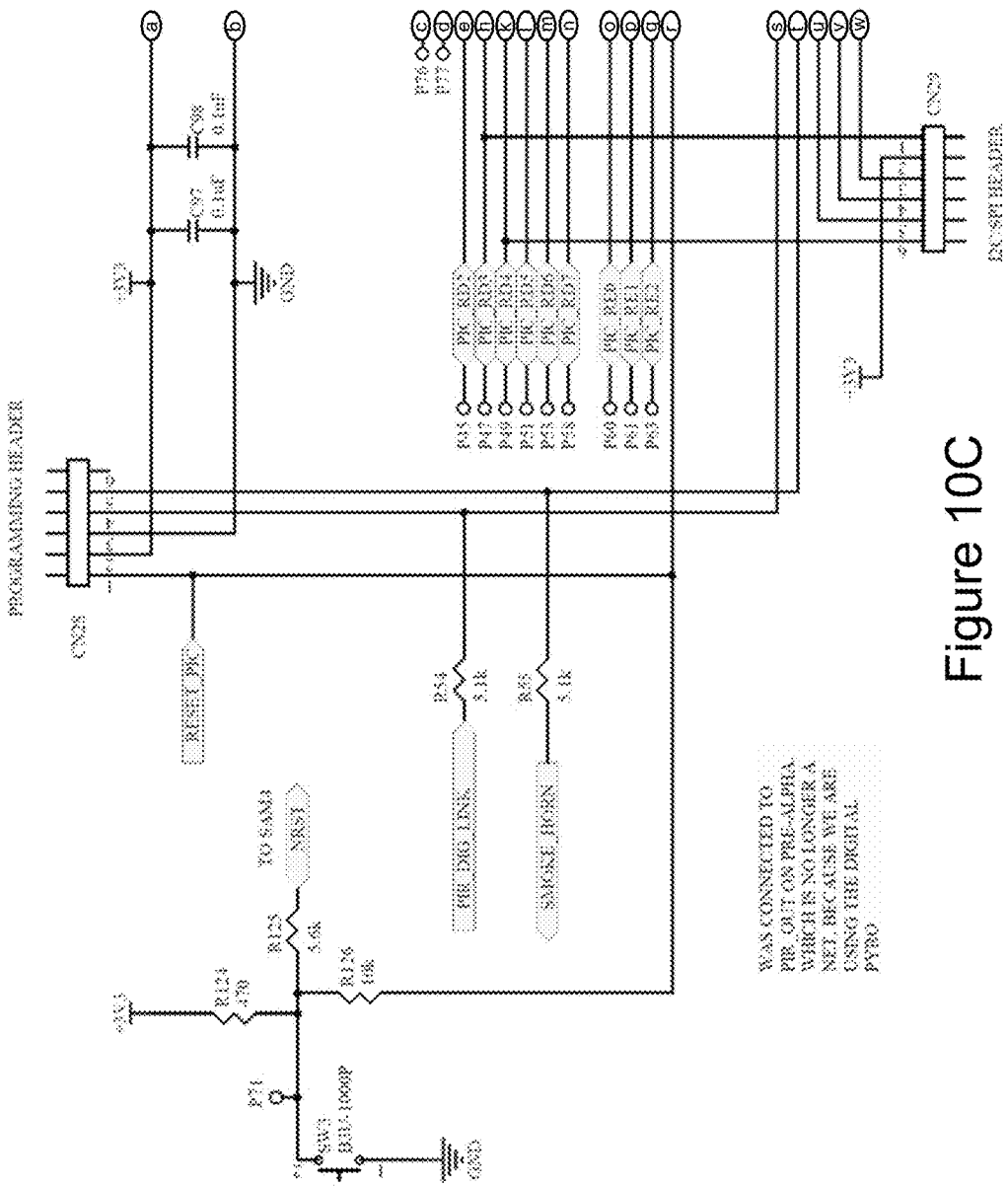
Figure 10D:
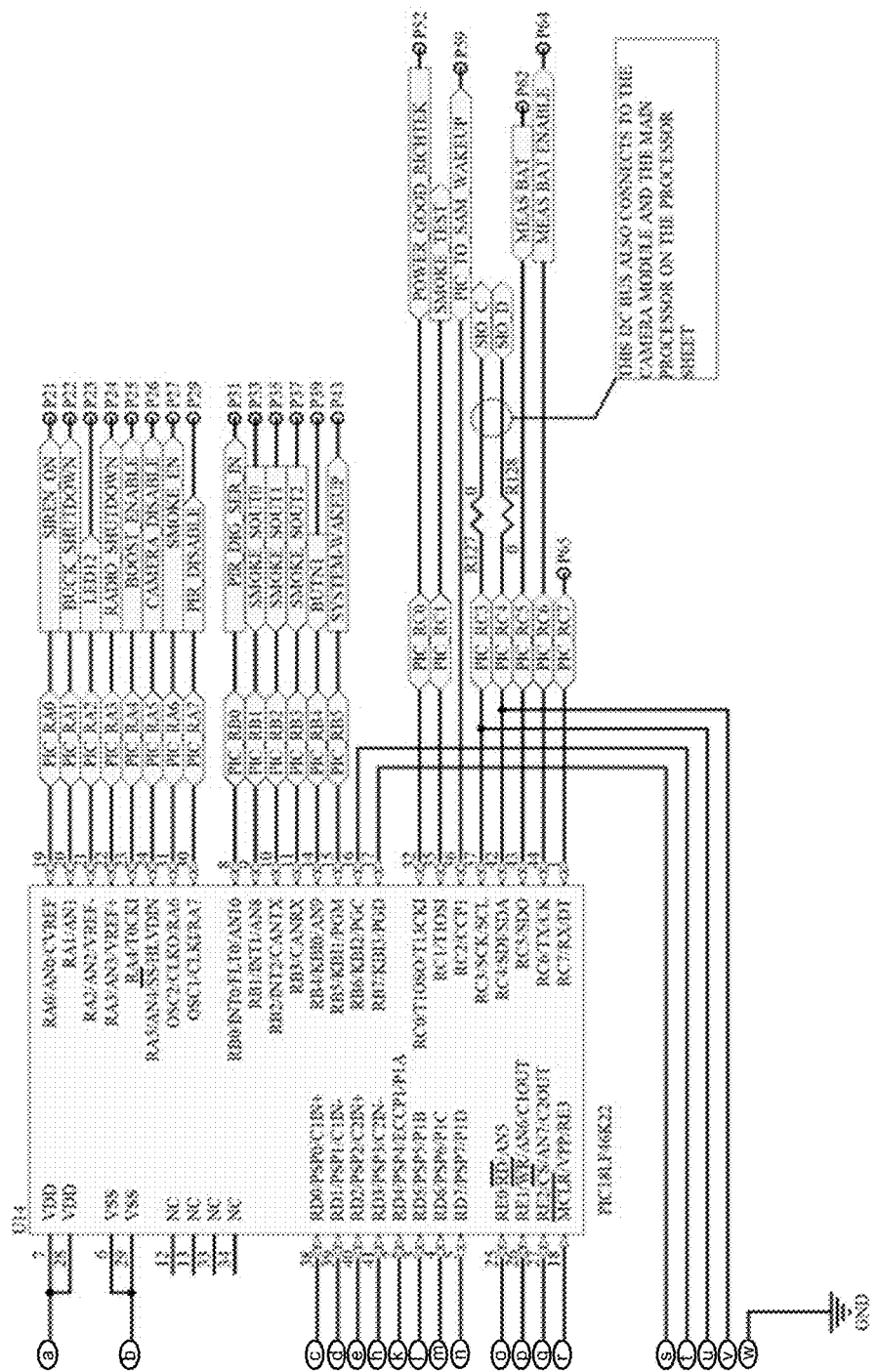

FIG. 9 is a flowchart of an example method 900 for provisioning a low-power processing device.

In block 902, the low-power processing device is powered on. In the example depicted in FIG. 9, an instance of the security sensor 140 is referenced. However, it should be understood that the method 900 is applicable to other low-power processing devices having similar operational requirements, such as power preservation and the ability to communicate wirelessly with other devices. This document encompasses those devices as well.

In block 904, the processor 143 send the provisioning a request to the relay station 120 via the transceiver 152 using a wireless connection and securely authenticates with the relay station 120. The security relay station 120 may using encryption (e.g., AES 128, 196, or 256, etc. encryption) to protect any data transmitted by it, such as that exchanged with the sensor 140. In some embodiments, in the sensor 140 a significant number of key data is preloaded into memory (e.g., 4 kB). A copy of the key data may be stored in a data store of the server 160. When a corresponding relay station 120 interacts with a given sensor 140, it can request and receive hashes of the key data from the server 160, and use it to verify the identity of the sensor (e.g., that it is really communicating with the right sensor) before pairing with it.

A security sensor 140 may periodically rotate its key data and the security relay station/base station 120 can iterate through a set of sequential keys to determine which one the security sensor 140 is currently using. Since, in some embodiments, the security relay station 120 can determine the current date/time and a security sensor 140 may not be able to, the security relay station 120 may send a request requesting the sensor 140 to rotate its key. In this way, the relay station 120 may periodically update the encryption keys in case one is compromised. However, it is noted that as data requirements of a given security installation are low and relatively little data is transmitted wirelessly, it is unlikely that enough information can be collected to crack the encryption protocol (e.g., around 20 million plain text and encrypted-text pairs may be required to crack the encryption).

In some embodiments, a security relay station 120 may have limited access to the server 160 in the event a relay station 120 is physically compromised by an unauthorized user. If an unauthorized user obtains physical access to a user's system, users are notified of the irregularities (e.g., that the security installation may be down or compromised). For instance, if there is period where the security sensor 140 fails to sync with the relay station 120 for predetermined amount of time, the server 160 (e.g., a management engine 170 thereof) will notify the user that a sensor is down. The same may be true for a security relay station 120. The disruption could be due to jamming from a microwave, failure in the sensor 140 or security relay station 120, or by malicious intent. The above security mechanisms provides a convenient way of protection for a variety of extreme cases.

In block 908, the processor 124 of the security relay station 120 retrieves from the memory 126 state settings for the security sensor 140 and provisions the security sensor 140 with the state settings in block 910. The processor 145 of the security sensor 140 receives the state settings for the security sensor 143 from the relay station 120, and configures, in block 912, the components of the security sensor 140 using the state settings. In block 914, the method 900 places the sensor components into an armed or disarmed sleep state as applicable.

White the method 900 is described in the context of powering on a security sensor 140, it is noted that the settings of the security sensor 140, as well as the operation of the security sensor 120, can be controlled remotely via the security application 108. Accordingly, when the security relay station 120 receives instructions from the server 160 to update one or more operational parameters of the components of the security sensor 140, such as the sensitivity of the motion sensor 150$n$, activation or deactivation of the siren 155, activation or deactivation of the smoke sensor 150$a$, etc., the security relay station 120 provisions the instructions to the security sensor 140 responsive to receiving a check-in signal from the security sensor 140 in a manner substantially similar to that described in FIG. 9. Similarly, when a remotely-initiated user instruction is received by the security relay station 120 to capture a photograph or video using the camera 148, corresponding instructions are provided to the security sensor 140 responsive to receiving a check-in signal from the security sensor 140, which the security sensor 140 then carries out.

The frequency at which the security sensor 140 checks and with the security relay station 120 may be fixed or dynamic. In some embodiments, the system 100 may learn user patterns based on the monitoring being performed by the security sensor(s) 140 and/or the user input provided via the security application 108, and may set the frequency in which the security sensor 140 checks in with the security relay station 120 based on the learned behavior. For example, the management engine 170 on the server 160 may include machine-learning models, such as a Bayesian network, decision tree, or other suitable machine learning models that can analyze the user pattern data stored in the data store of the server 160 and output updated sleeping cycles for each of the sensors 140 of a given installation. The following example inputs could be used for such learning, such as periods of inactivity, arm and disarm frequency and occurrence, time of day, season, etc.

In some embodiments, where the security sensor 140 is tripped frequently, the processor 143 may increase the check-in frequency to increase performance and provide a more responsive experience to the user. On the other hand, if the security sensor 140 is tripped infrequently, the processor 143 may decrease the check-in frequency to avoid unnecessarily wasting power. For example, a default frequency may instruct the processor 143 to check-in with the security relay station 120 every six seconds, but as the sensor becomes increasingly tripped based activity that is detected within the monitored zone, the processor 143 may increase the frequency to three seconds. As these periodic check-ins account for a considerable amount of the battery life of the security sensor 140, due to the wireless transmission being performed by the transceiver 152, dynamically adapting the check-in frequency to account for periods of inactivity is advantageous as it prevents unnecessary energy waste.

In some embodiments, the client devices 106 may transmit data to the other entities of the network 102 using security protocols (e.g., SSL (HTTPS) certificates) and the server 160 may exchange data with the security relay station(s) 120 using two-way (or bi-directional) SSL (HTTPS) encryption and certificates (e.g., under the presumption that neither node trusts the other).

Figure 12B:
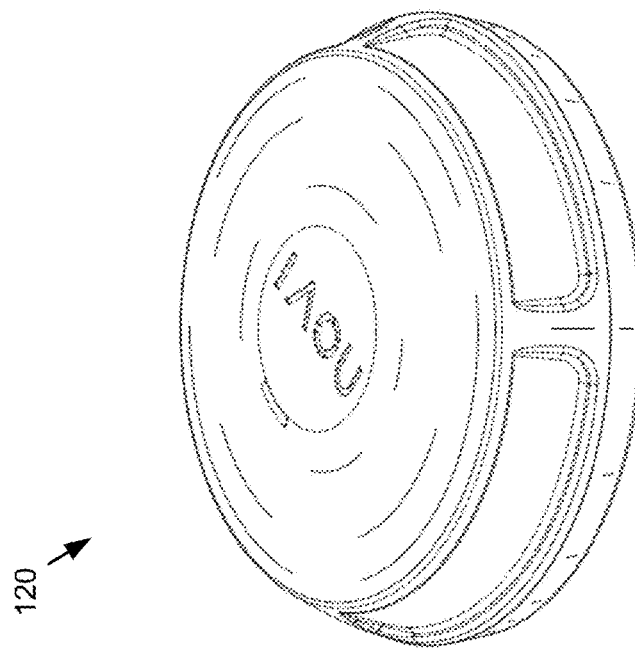
FIG. 12B is a perspective view of an example relay station.
Figure 12A:
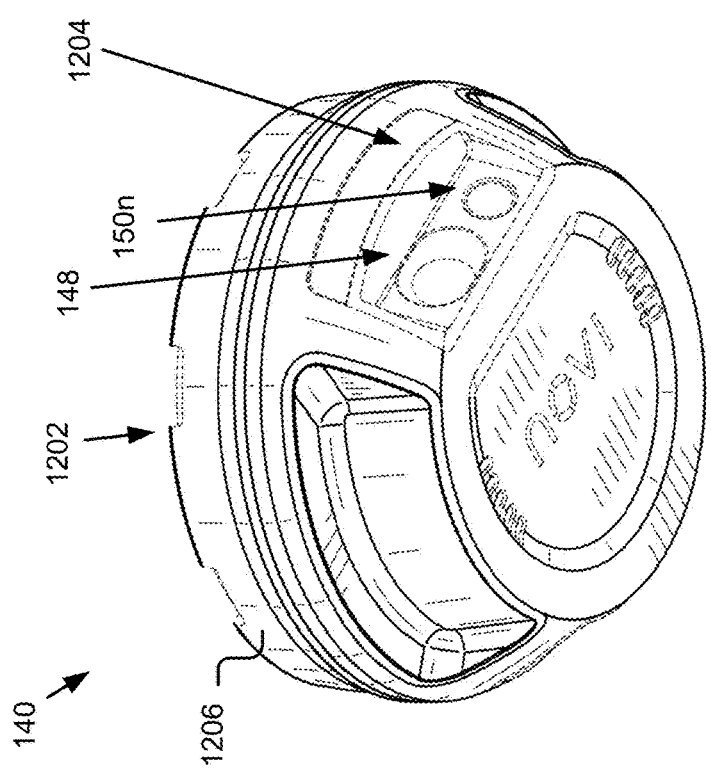
FIG. 12A is a perspective view of an example sensor.

FIG. 12A is a view of an example sensor 140 and FIG. 12B is a view of an example relay station 120. FIG. 12A in particular depicts an example sensor 140 having a body 1202 for housing the internal components of the sensor 140, which include a PIR sensor for detecting moving objects within its field of view, LED(s) 1204 for providing light/flash for capturing images with camera and/or serving as visual indicators of the status of the sensor 140 (e.g., green indicating the sensor 140 is operating correctly, red indicating a problem with the sensor 140, etc.), a camera 148 for capture images of detected moving objects, etc. The housing may include a shield for covering a window in the body and having an aperture through which the lens of the camera is directed. The body further includes a lid 1206 covering the topside of the sensor. The lid is removable and depending on the embodiment includes a plurality of holes through which fastening devices may be passed to either fasten the sensor to a mounting surface (e.g., the ceiling) or fasten the lid to the main body of the sensor 140. In further embodiments, adhesive tape or other fastening devices (e.g., magnets) may be used to fasten the lid to the mounting surface.

FIGS. 6A-6E depict example global variables that the microcontroller 145 and the memory 144 may preserve during the sleep cycle of the processor 143. The depicted code 600 is written in c, but it should be understood that other suitable languages are also applicable. The included structures can preserve all of the user state settings of the peripherals if necessary.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Various aspects of the technology described herein can take the form of a hardware embodiment, a software embodiment, or embodiments containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

A computer network, such as the network 102 may include any number of networks and/or network types. For example, the network 102 may include, but is not limited to, one or more local area networks (LANs), personal communication networks (PANs), such as Bluetooth®, IrDA™, Zigbee®, etc., wide area networks (WANs) (e.g., the Internet), virtual private networks (VPNs), mobile (cellular) networks (e.g., a mobile network), wireless wide area network (WWANs), WiMAX® networks, peer-to-peer networks, other interconnected data paths across which multiple devices may communicate, various combinations thereof, etc.

The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

The mobile network may include a cellular network having distributed radio networks and a hub. In some embodiments, the client devices 106 may send and receive signals to and from a transmission node of the mobile network over one or more of a control channel, a voice channel, a data channel, etc. In some embodiments, one or more client devices 106 may connect to a wireless wide area network (WWAN) of the mobile network. The mobile network and client devices 106 may use a multiplexing protocol or a combination of multiplexing protocols to communicate including, for example, FDMA, CDMA, SDMA, WDMA, or any derivative protocols, or the like, etc.

The mobile network of the network 102 and client devices 106 may also employ multiple-input and output (MIMO) channels to increase the data throughput over the signal lines coupling the mobile network and client devices 106. The mobile network may be any generation mobile phone network. In some instances, the mobile network 102 maybe a 2G or 2.5G GSM, IS-95, etc., network; a 3G UTMS, IS-2000, etc., network; a 4G HSPA+, 3GPP LTE, WiMax™, 5G (and beyond) network; etc. In some instances, the mobile network may include a backwards-compatible multi-generational network that supports two or more technology standards.

Data transmitted by the network 102 may include packetized data (e.g., Internet Protocol (IP) data packets) that is routed to designated computing devices coupled to the network 102. In some embodiments, the network 102 may include a combination of wired and wireless networking software and/or hardware that interconnects the computing devices of the system (e.g., environment 100). For example, the network 102 may include packet-switching devices that route the data packets to the various computing devices based on information included in a header of the data packets.

The network adapters described herein may also be coupled to the system to enable the data processing system to become coupled to other data processing systems, storage devices, remote printers, etc., through intervening private and/or public networks.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A security sensor comprising:
   a battery power supply;
   a camera coupled to the battery power supply to receive power, the camera being placed in a camera sleep state and being wakeable to a camera awake state;
   an activity sensor coupled to the battery power supply to receive the power, the activity sensor configured to detect activity within a zone proximate the security sensor;
   a processor placed in a processor sleep state and wakeable to a processor awake state, the processor coupled to the battery power supply to receive power, and coupled to the camera to receive image data including images of the activity within the zone; and
   a microcontroller coupled to the battery power supply to receive the power, coupled to the activity sensor to receive interrupts responsive to detection by the activity sensor of the activity within the zone proximate the security sensor, and coupled to a processor to send and receive data, and, responsive to receiving a first interrupt from the activity sensor, the microcontroller being configured to place the processor in an awake state and place the camera in an awake state, wherein
   the camera, responsive to being placed in the camera awake state, captures a set of images of the activity within the zone and provides image data including the set of images to the processor,
   responsive to the image data being provided to the processor, the camera is placed in the camera sleep state, and
   responsive to the image data being transmitted to a remote network entity, the processor is placed in the processor sleep state.

2. The security sensor of claim 1, wherein the processor, upon being placed in the processor awake state, polls the microcontroller for any events that occurred during the processor sleep state, determines a motion detection event occurred, places the camera in the camera awake state, sends a capture signal to the camera, and receives and processes the image data including the set of images.

3. The security sensor of claim 1, further comprising:
   a non-transitory memory coupled to the battery power supply and the processor; and
   a transceiver coupled to the battery power supply, the memory, and the processor, wherein, responsive to receiving the image data from the camera, the processor caches the image data in the non-transitory memory and the transceiver retrieves the image data cached in the non-transitory memory and transmits the image data to the remote security sensor relay for transmission to a security server accessible via the Internet.

4. The security sensor of claim 3, wherein the battery power supply, the camera when idle, the activity sensor when idle, the microcontroller, the processor when in the processor sleep state, the non-transitory memory, and the transceiver when idle, collectively draw a current of less than or equal to about 100 micro amps.

5. The security sensor of claim 1, further comprising:
   a non-transitory memory integrated with the microcontroller that stores state data including operational settings for the activity sensor, wherein upon awaking the processor retrieves the state data from the non-transitory memory integrated with the microcontroller.

6. The security sensor of claim 1, wherein the processor operates on a sleep cycle and includes a sleep timer that routinely wakes the processor from the processor sleep state based on an expiration of a sleeping period.

7. The security sensor of claim 6, wherein the sleeping period is predetermined or dynamically set.

8. The security sensor of claim 1, wherein the activity sensor is a motion sensor configured to detect motion of a moving object within the zone.

9. The security sensor of claim 8, wherein the motion sensor is a passive infrared sensor.

10. The security sensor of claim 1, wherein the activity sensor is a smoke detector configured to detect smoke within the zone.

11. A method for controlling operation of a security sensor, comprising:
    placing a processor of the security sensor in a processor sleep state, the processor being wakeable to an awake state and being coupled to a camera configured to capture a zone of a premises proximate the security sensor;
    detecting with an activity sensor activity occurring within the zone;
    receiving at a microcontroller a first interrupt from the activity sensor responsive to detection by the activity sensor of the activity within the zone proximate the security sensor;
    responsive to receiving at the microcontroller the first interrupt from the activity sensor, placing the processor in the processor awake state;
    signaling the camera to automatically capture a set of images;
    receiving the image data including the set of images captured by the camera; and
    automatically placing the processor back into the processor sleep state responsive to a transmission of the set of images via a computer network.

12. The method of claim 11, further comprising:
    upon placing the processor in the awake state, polling, with the processor via a communications bus, the microcontroller for any events that occurred during the sleep state;
    determining a motion detection event occurred; and
    receiving the image data including the set of images at the processor from the camera and processing the image data.

13. The method of claim 11, further comprising:
    responsive to the processor receiving the image data from the camera, caching the image data in a non-transitory memory;
    retrieving using a transceiver the image data cached in the non-transitory memory; and
    transmitting the image data to a remote security sensor relay for transmission to a security server accessible via the Internet.

14. The method of claim 13, wherein a battery power supply, the camera when idle, the activity sensor when monitoring, the microcontroller, the processor when in the processor sleep state, the non-transitory memory, and the transceiver when idle, collectively draw a current of less than or equal to 50 micro amps.

15. The method of claim 11, further comprising:
    storing state data in a non-transitory memory integrated with the microcontroller; and
    upon placing the processor in the awake state, retrieving using the processor the state data from the non-transitory memory integrated with the microcontroller.

16. The method of claim 11, further comprising:
operating the processor on a sleep cycle; and
routinely waking the processor from the sleep state using a sleep timer based on an expiration of a sleeping period.

17. The method of claim 16, wherein the sleeping period is predetermined or dynamically set.

18. The method of claim 11, wherein the activity sensor is a motion sensor configured to detect motion of a moving object within the zone.

19. The method of claim 18, wherein the motion sensor is a passive infrared sensor.

20. A method comprising:
placing an image sensor of a security sensor in an inactive state, the image sensor positioned to capture images of a zone proximate the security sensor;
receiving a user-initiated interrupt or an activity-sensor-initiated interrupt from a microcontroller at the image sensor;
responsive to receiving the user-initiated interrupt or the activity-sensor-initiated interrupt, placing a processor of the security sensor in a processor awake state;
automatically capturing using the image sensor a set of image frames of a potential threat within the zone proximate to the security sensor;
sending images including the set of image frames to the processor while in the processor awake state;
transmitting using a wireless transceiver the image data via a wireless connection to a remote security relay station; and
automatically placing the processor into a processor sleep state responsive to transmitting the image data.

21. The method of claim 20, further comprising:
sensing using a light sensor to determine available light within the zone;
determining that a flash was not triggered during capture of the set of image frames based on the available light; and
triggering the flash to alert potential threat in the zone that the set of images frames were captured.

22. The method of claim 20, further comprising:
retrieving image sensor settings from the microcontroller; and
configuring the image sensor using the image sensor settings.

* * * * *